(12) United States Patent
Ochiai et al.

(10) Patent No.: US 10,708,523 B2
(45) Date of Patent: Jul. 7, 2020

(54) IMAGING DEVICE, IMAGING SYSTEM, AND MOVING BODY

(71) Applicant: CANON KABUSHIKI KAISHA, Tokyo (JP)

(72) Inventors: Kei Ochiai, Inagi (JP); Katsuhito Sakurai, Machida (JP); Atsushi Furubayashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 2 days.

(21) Appl. No.: 16/141,748

(22) Filed: Sep. 25, 2018

(65) Prior Publication Data

US 2019/0104263 A1  Apr. 4, 2019

(30) Foreign Application Priority Data

Sep. 29, 2017  (JP) .................. 2017-192055

(51) Int. Cl.
| | |
|---|---|
| *H04N 5/341* | (2011.01) |
| *H04N 5/376* | (2011.01) |
| *H04N 5/3745* | (2011.01) |
| *H04N 5/378* | (2011.01) |
| *H04N 5/369* | (2011.01) |
| *H04N 5/347* | (2011.01) |

(52) U.S. Cl.
CPC ............ *H04N 5/341* (2013.01); *H04N 5/347* (2013.01); *H04N 5/378* (2013.01); *H04N 5/379* (2018.08); *H04N 5/3765* (2013.01); *H04N 5/37455* (2013.01); *H04N 5/37457* (2013.01)

(58) Field of Classification Search
CPC ........ H04N 5/341; H04N 5/379; H04N 5/347; H04N 5/37455; H04N 5/37457; H04N 5/3765; H04N 5/378
See application file for complete search history.

(56) References Cited

U.S. PATENT DOCUMENTS

| | | | | |
|---|---|---|---|---|
| 2006/0012698 A1* | 1/2006 | Nitta | ................. | H04N 5/3575 348/308 |
| 2008/0129851 A1* | 6/2008 | Kasuga | ................. | H04N 5/335 348/294 |
| 2009/0316034 A1* | 12/2009 | Kusuda | ................. | H04N 5/374 348/308 |
| 2016/0286144 A1* | 9/2016 | Yanai | ................. | H04N 5/378 |
| 2018/0139396 A1* | 5/2018 | Totsuka | ............. | H04N 5/37455 |

FOREIGN PATENT DOCUMENTS

| | | | |
|---|---|---|---|
| JP | 2012-191400 A | | 10/2012 |
| JP | 2012191400 A | * | 10/2012 |
| JP | 2013-255035 A | | 12/2013 |
| JP | 2017-108349 A | | 6/2017 |

* cited by examiner

*Primary Examiner* — Sinh Tran
*Assistant Examiner* — Zhenzhen Wu
(74) *Attorney, Agent, or Firm* — Canon U.S.A., Inc. IP Division

(57) ABSTRACT

Provided is an imaging device configured to sequentially perform AD conversion for A signals of pixels of the first row, A signals of pixels of the second row, A+B signals of the pixels of the first row, and A+B signals of the pixels of the second row.

21 Claims, 29 Drawing Sheets

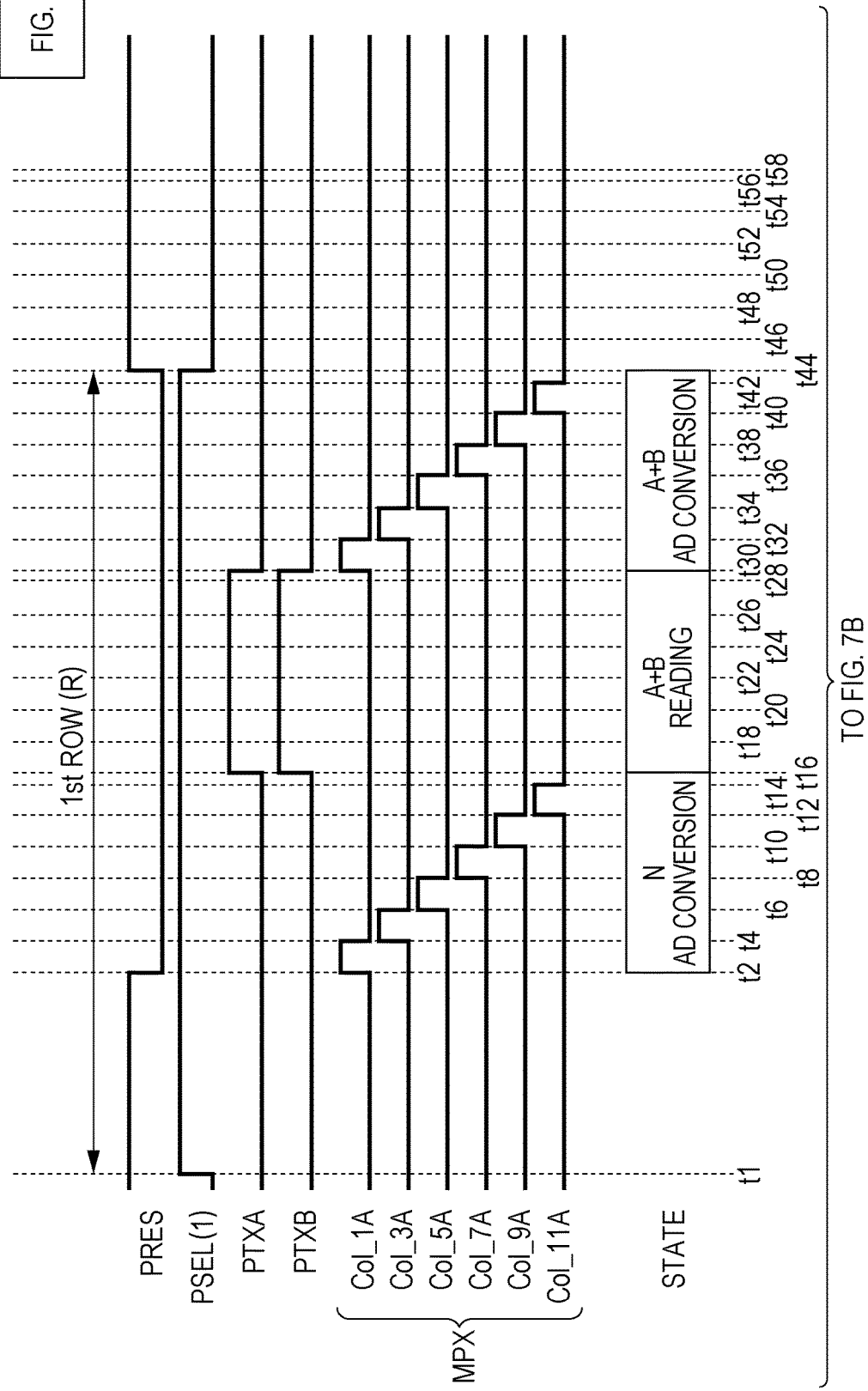

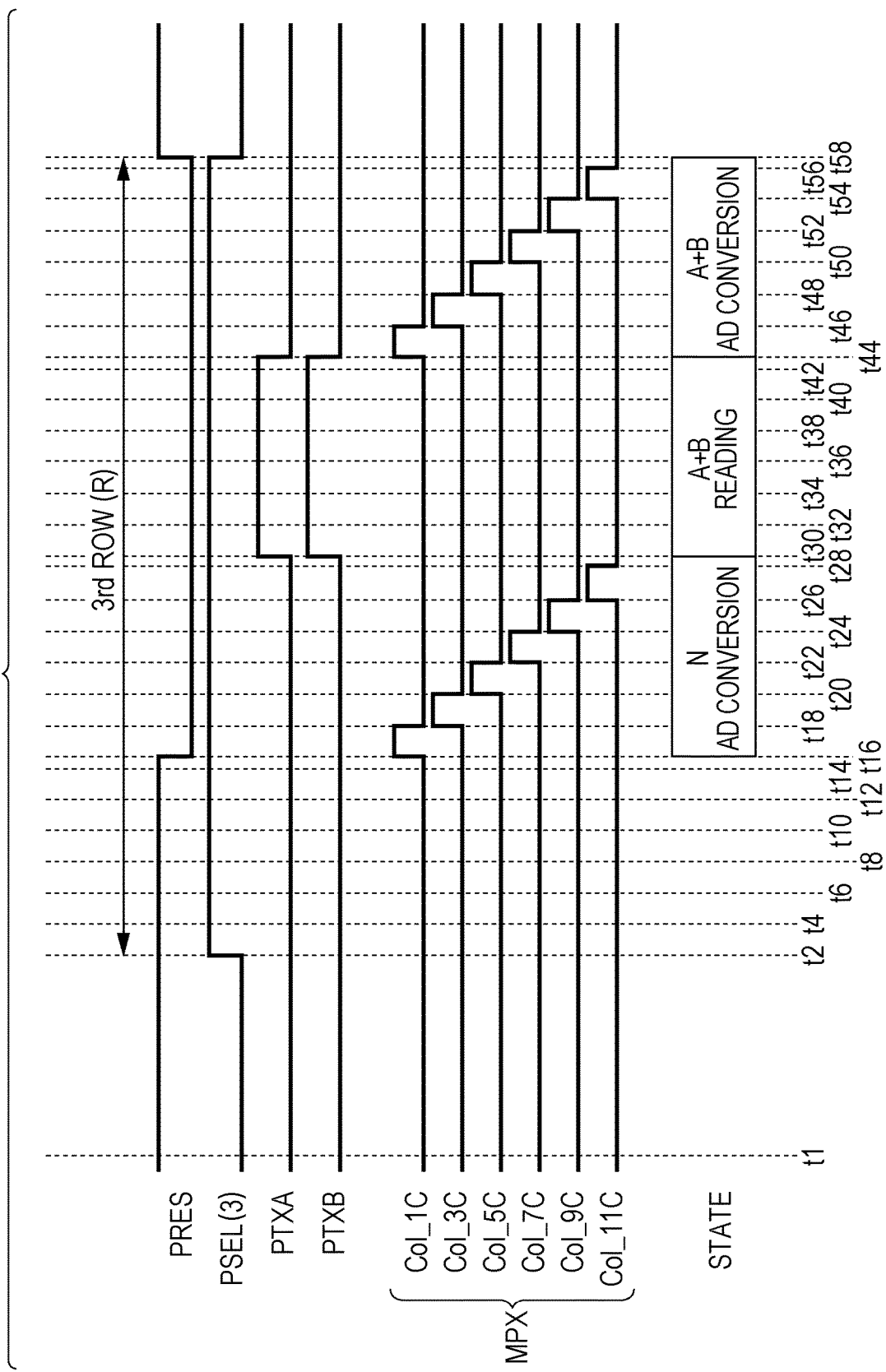

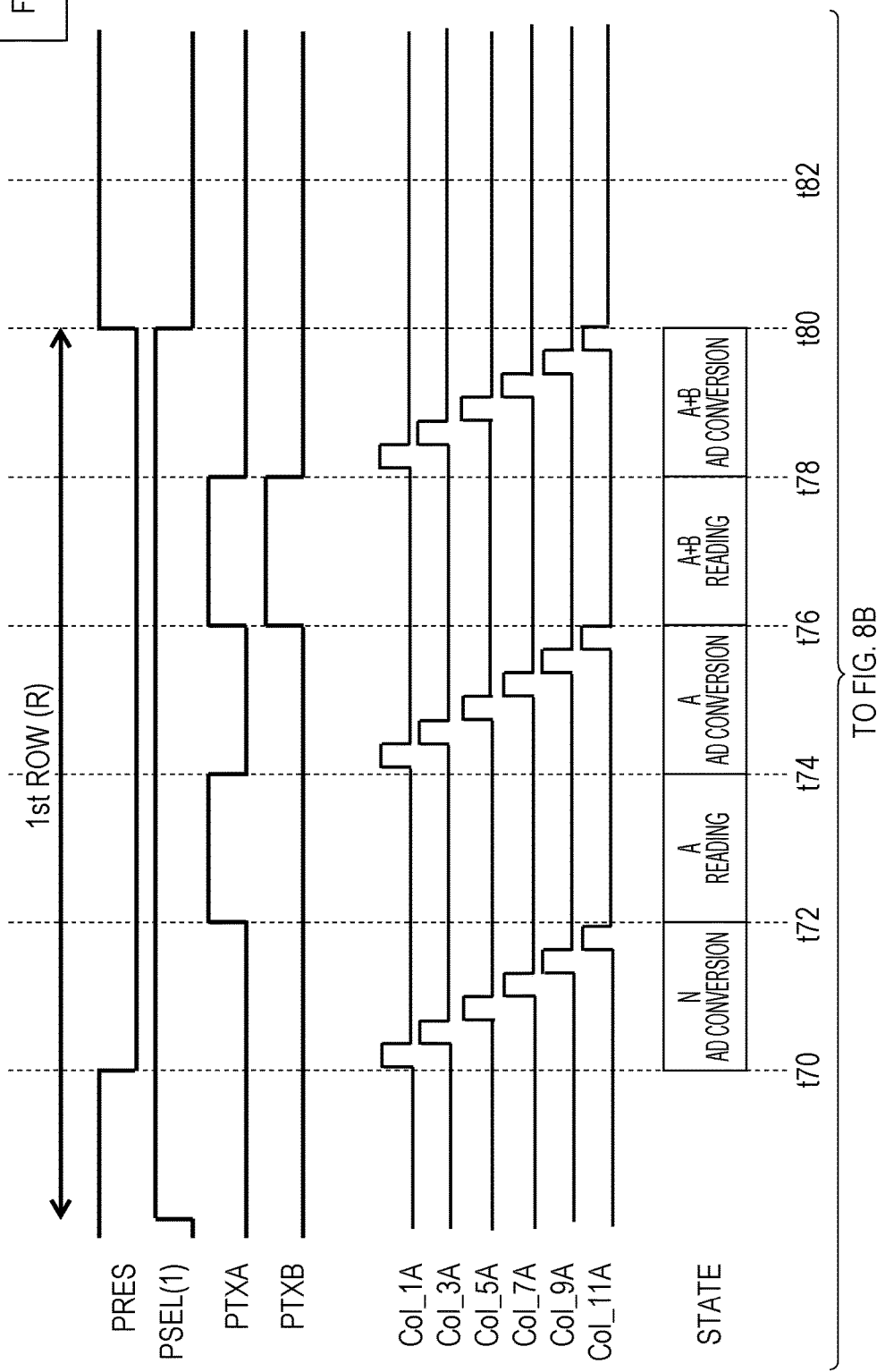

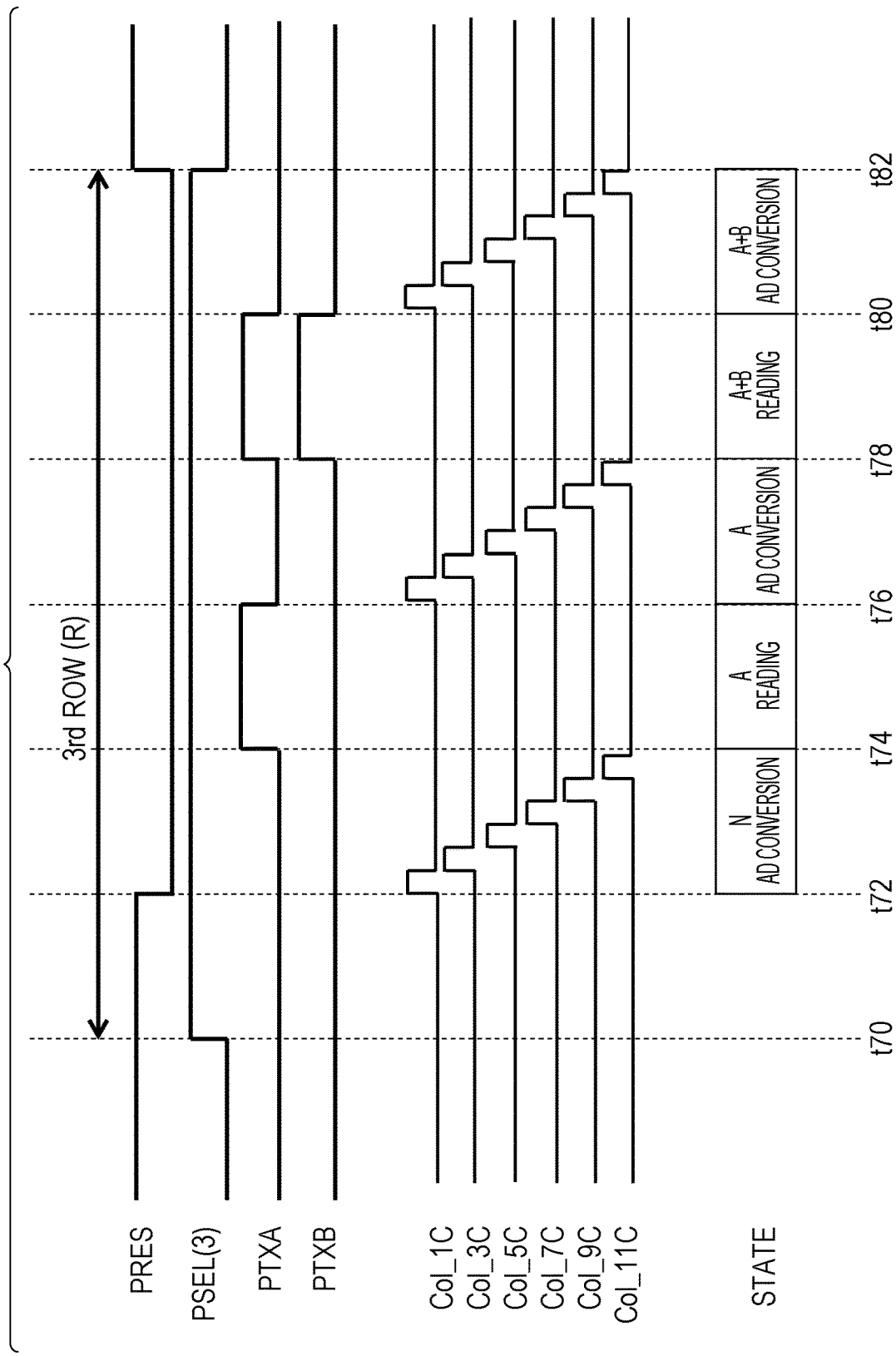

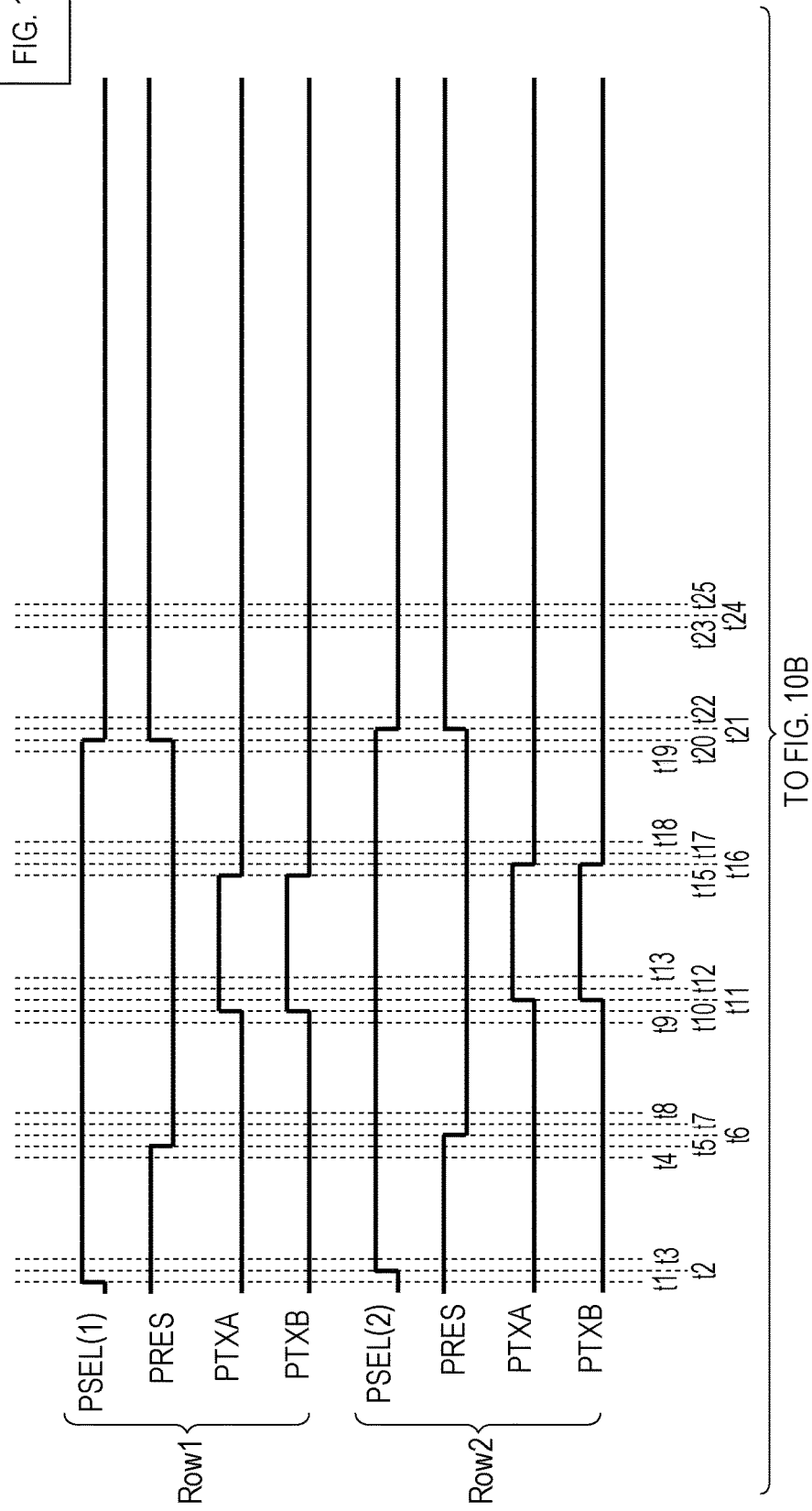

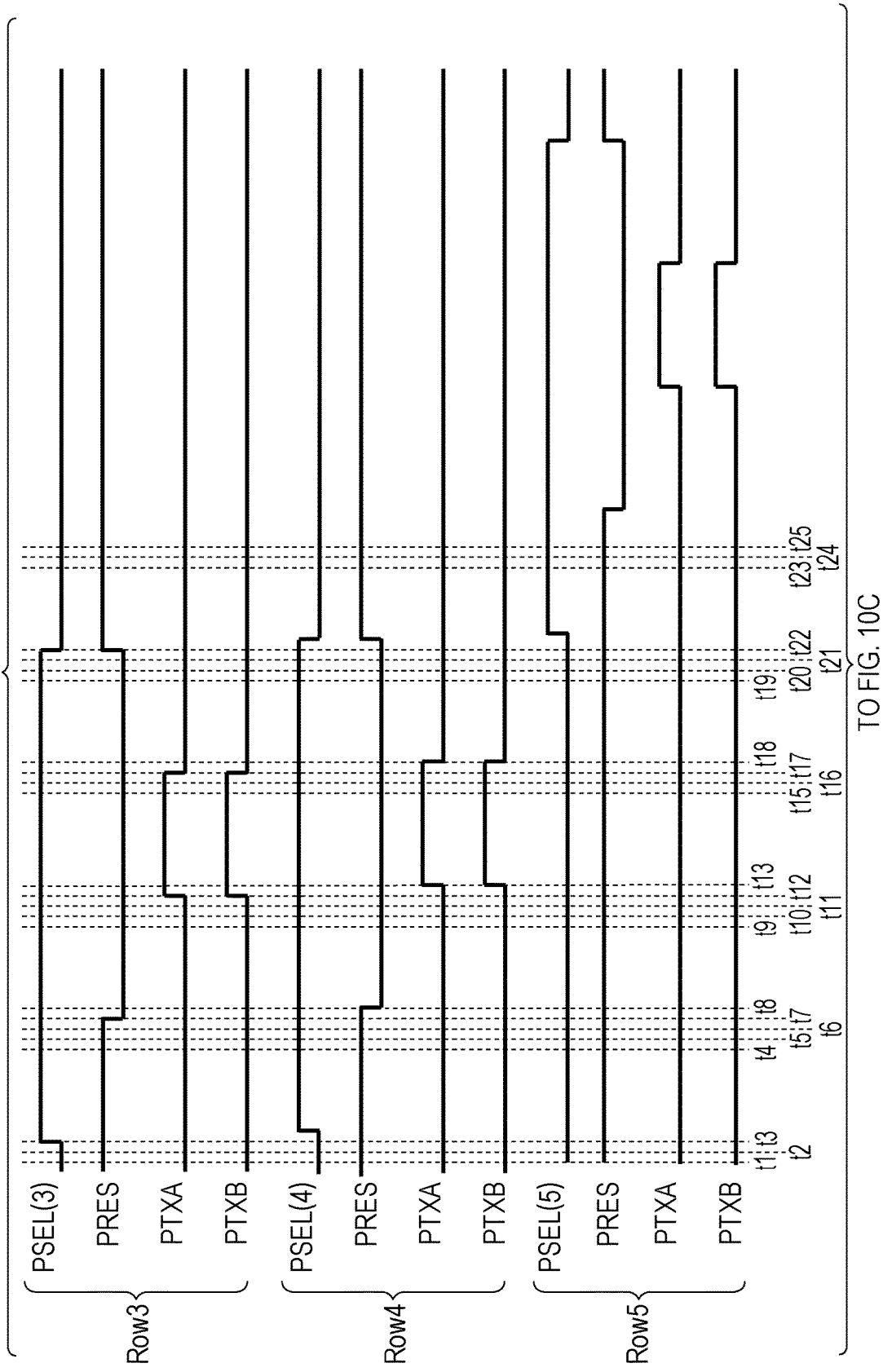

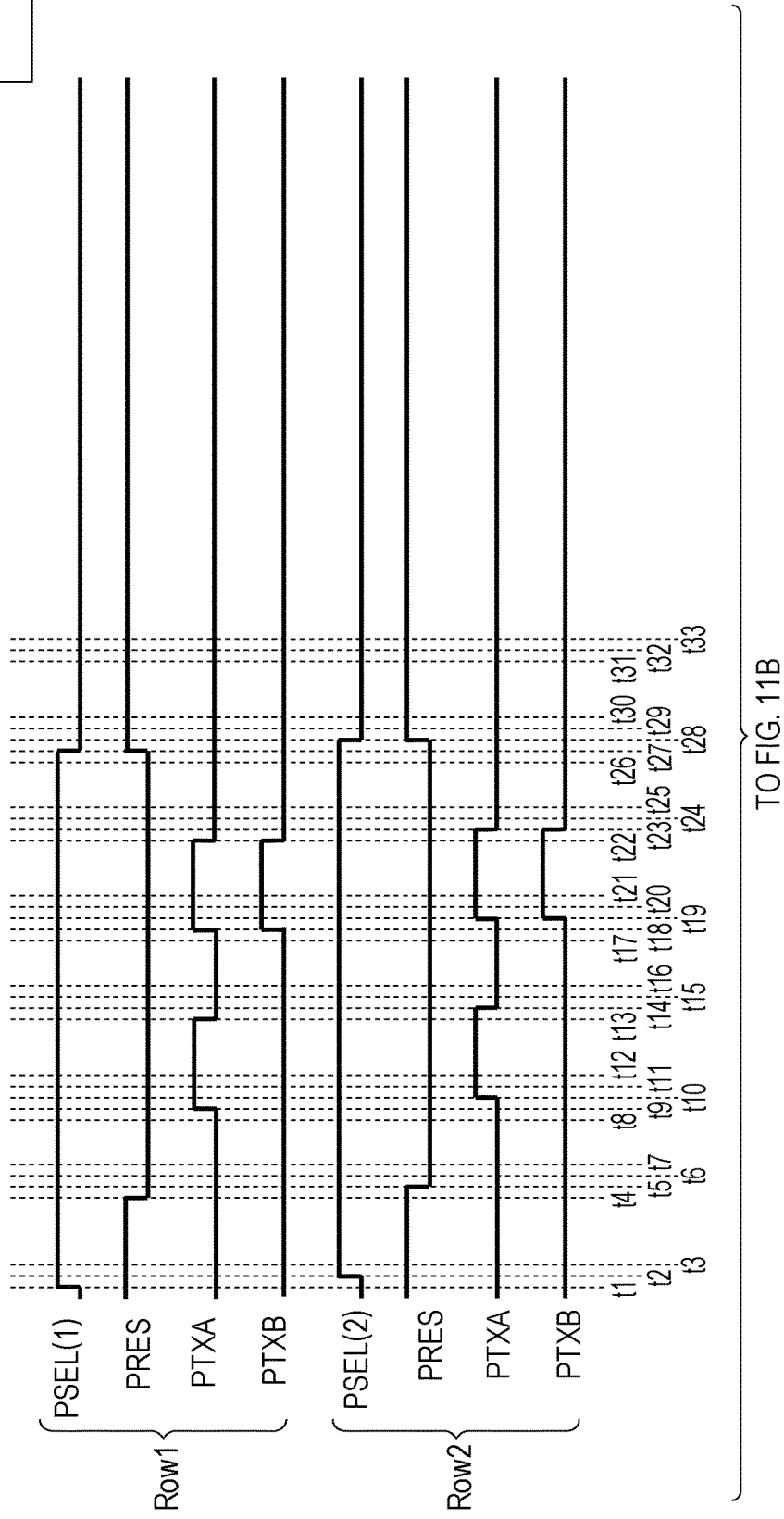

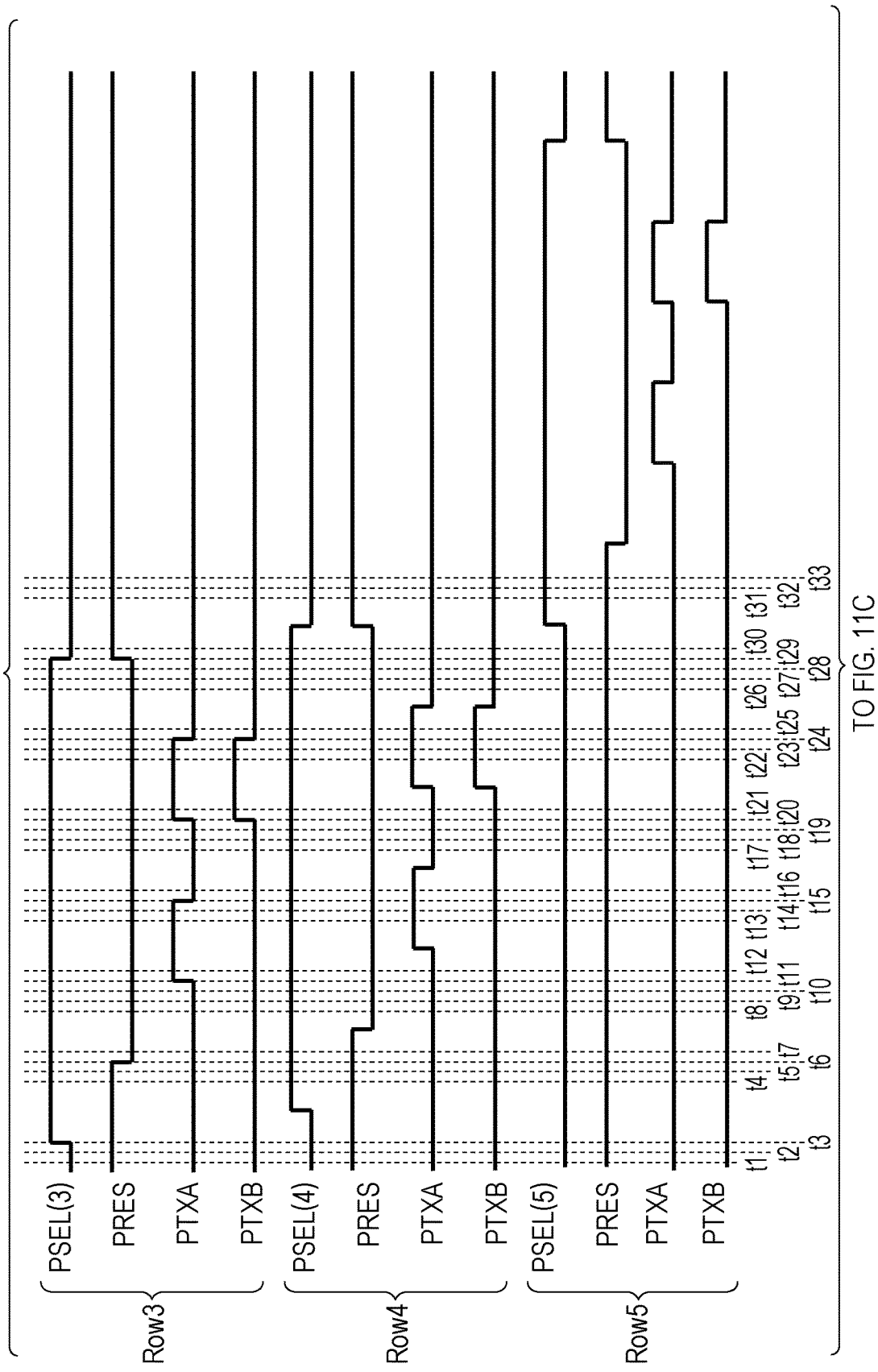

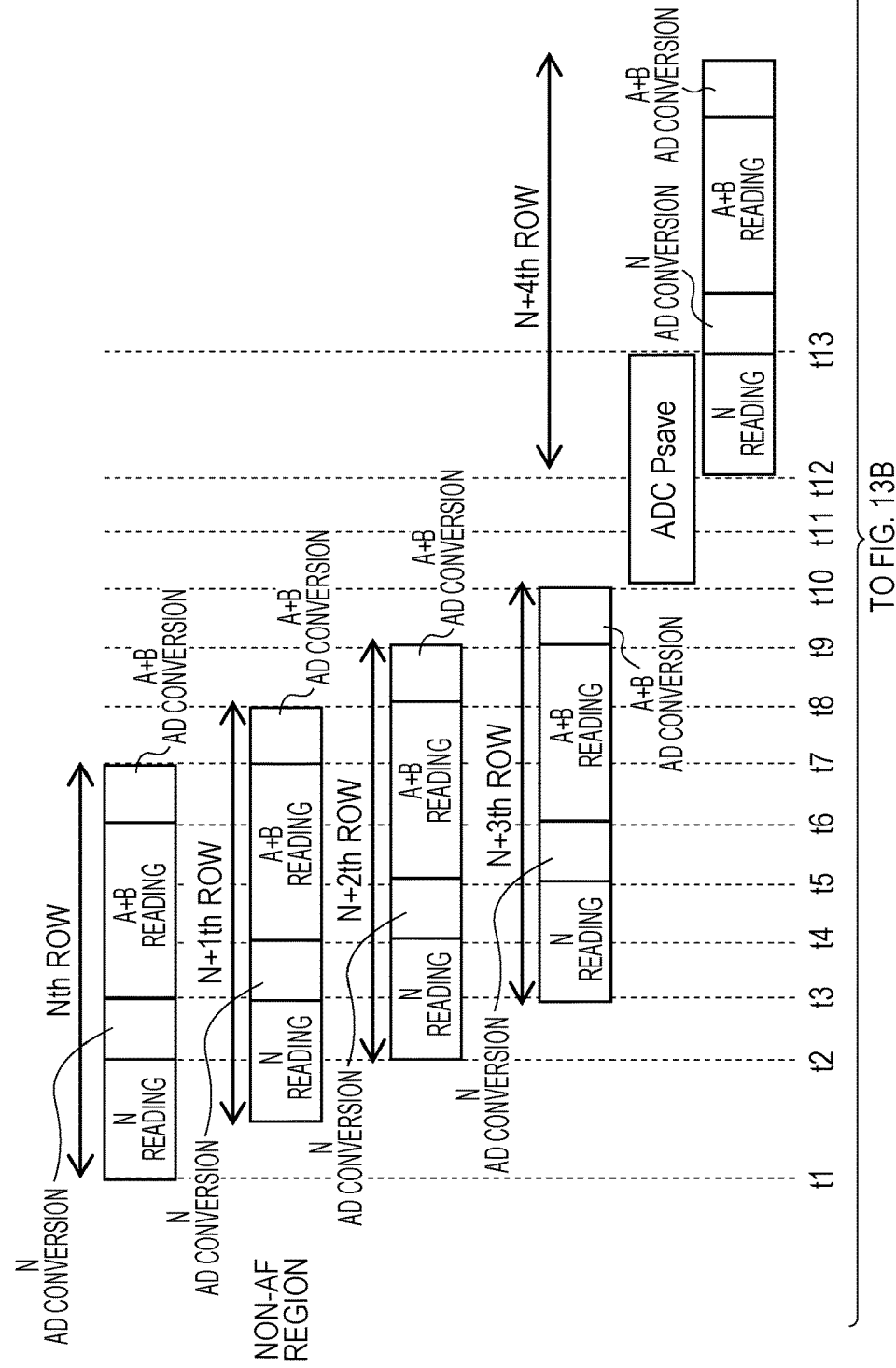

FROM FIG. 13A
TO FIG. 13C

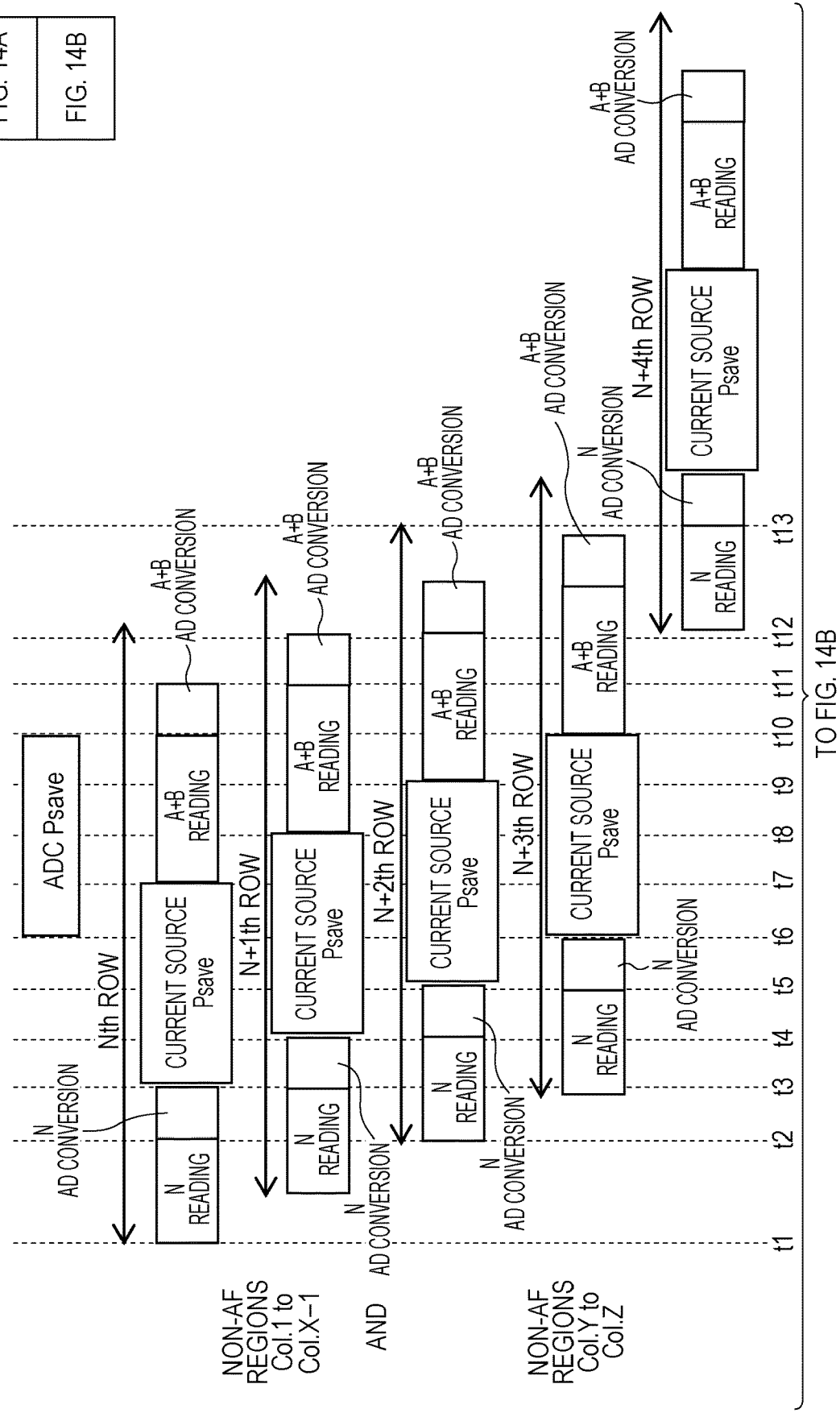

FIG. 18B
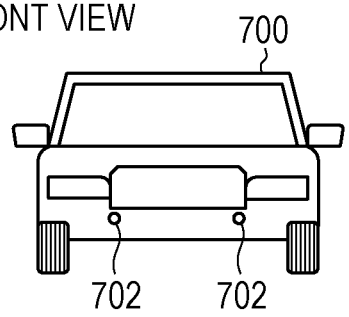
FRONT VIEW
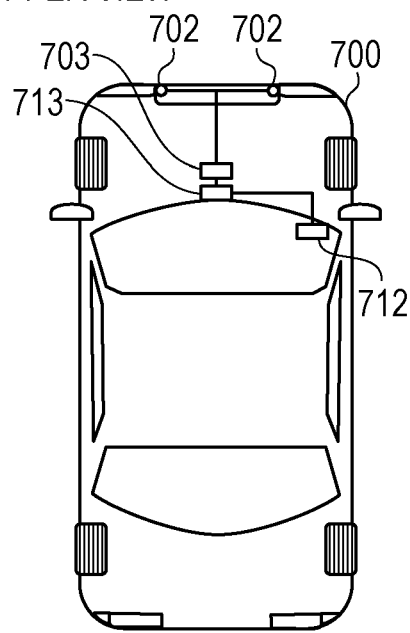
UPPER VIEW
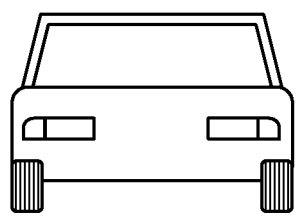
BACK VIEW

IMAGING DEVICE, IMAGING SYSTEM, AND MOVING BODY

BACKGROUND OF THE INVENTION

Field of the Invention

One disclosed aspect of the embodiments relates to an imaging device, an imaging system, and a moving body.

Description of the Related Art

An imaging device has been known, which has a configuration in which multiple photodiodes are provided for a single microlens. An imaging device of Japanese Patent Laid-Open No. 2012-191400 has a pixel configured such that two photodiodes are provided for a single microlens. The pixel outputs a signal based on electric charges generated only by some of the photodiodes and an addition electric charge obtained by adding up electric charges of the multiple photodiodes.

In Japanese Patent Laid-Open No. 2012-191400, in the configuration in which the first signal based on the electric charges generated by only some of the photodiodes and the second signal based on the addition electric charge obtained by adding up the electric charges of the multiple photodiodes are AD-converted, study has not been conducted on higher-speed operation. Specifically, study has not been conducted on the order of signals to be AD-converted in the configuration in which the first and second signals output from each of the pixels arranged in multiple rows are AD-converted.

SUMMARY OF THE INVENTION

One aspect of the embodiments has been made in view of the above-described problem. One aspect is an imaging device including multiple pixels each having multiple photoelectric conversion units, an AD conversion unit, and a control unit. Each of the multiple pixels outputs a first signal based on signals of only some of the multiple photoelectric conversion units and a second signal based on signals of the multiple photoelectric conversion units. A photoelectric conversion period of the photoelectric conversion units corresponding to the first signal and a photoelectric conversion period of the photoelectric conversion units corresponding to the second signal at least partially overlap with each other. The multiple pixels are arranged in a first row and a second row. The control unit causes the AD conversion unit to perform AD conversion for converting the first signal output from the pixel of the first row into a digital signal during a first period. The control unit causes the AD conversion unit to perform AD conversion for converting the first signal output from the pixel of the second row into a digital signal before AD conversion for converting the second signal output from the pixel of the first row into a digital signal during a second period after the first period. The control unit causes the AD conversion unit to perform the AD conversion for converting the second signal output from the pixel of the first row into the digital signal during a third period after the second period. The control unit causes the AD conversion unit to perform AD conversion for converting the second signal output from the pixel of the second row into a digital signal during a fourth period after the third period.

Further features of the disclosure will become apparent from the following description of exemplary embodiments (with reference to the attached drawings).

BRIEF DESCRIPTION OF THE DRAWINGS

FIGS. 7A and 7B are a chart of operation of the imaging device.

FIGS. 8A and 8B are a chart of operation of the imaging device.

FIGS. 10A to 10C are a chart of operation of the imaging device.

FIGS. 11A to 11C are a chart of operation of the imaging device.

FIGS. 13A to 13C are a chart of operation of the imaging device.

FIGS. 14A and 14B are a chart of operation of the imaging device.

FIGS. 18A and 18B are a diagram and a view of a configuration of a moving body.

DESCRIPTION OF THE EMBODIMENTS

The technique described below provides a proper order of signals to be AD-converted in a configuration in which first and second signals output from each of pixels arranged in multiple rows are AD-converted.

Hereinafter, each exemplary embodiment will be described with reference to the drawings. Note that unless otherwise stated, a transistor is an N-type transistor in description below. However, the exemplary embodiments described below are not limited to the N-type transistor, and a P-type transistor may be used as necessary. In this case, the potentials of a gate, a source, and a drain of the transistor can be changed as necessary in description of the exemplary embodiments. For example, in the case of a transistor configured to operate as a switch, a low level and a high level of a potential to be supplied to a gate may be inverted from those described in the exemplary embodiments.

First Exemplary Embodiment (Entire Configuration of Imaging Device)

Figure 1:
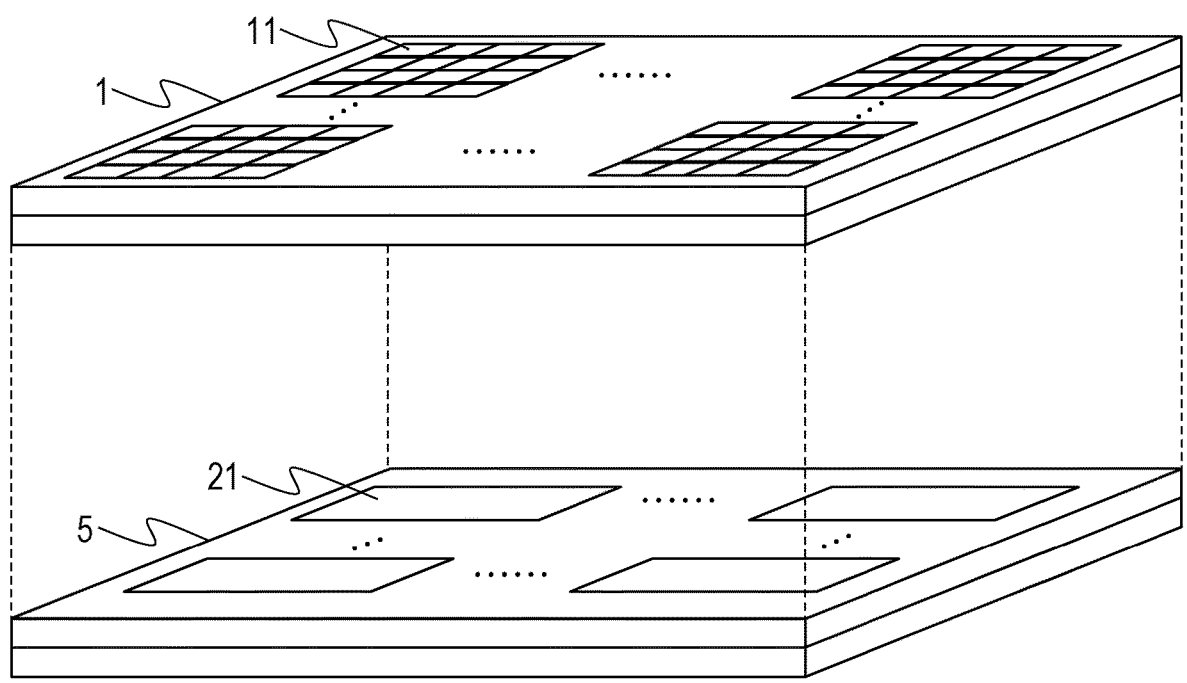
FIG. 1 is a view of a configuration of an imaging device.

FIG. 1 is a view of a first chip 1 and a second chip 5 provided at an imaging device of the present exemplary embodiment. In the first chip 1, pixels 11 are arranged in multiple rows and multiple columns. Moreover, in the second chip 5, signal processing circuits 21 are arranged in multiple rows and multiple columns Note that only the pixels 11 and the signal processing circuits 21 are illustrated in the figure, but control lines for controlling the pixels 11 and signal lines for transferring signals output from the pixels 11 are additionally arranged at the first chip 1, as necessary. Moreover, drive circuits such as a vertical scanning circuit and a timing generator are arranged at the first chip 1 or the second chip 5, as necessary.

(Layout Relationship Among Pixels and Signal Processing Circuits as Viewed in Plane)

Figure 2:
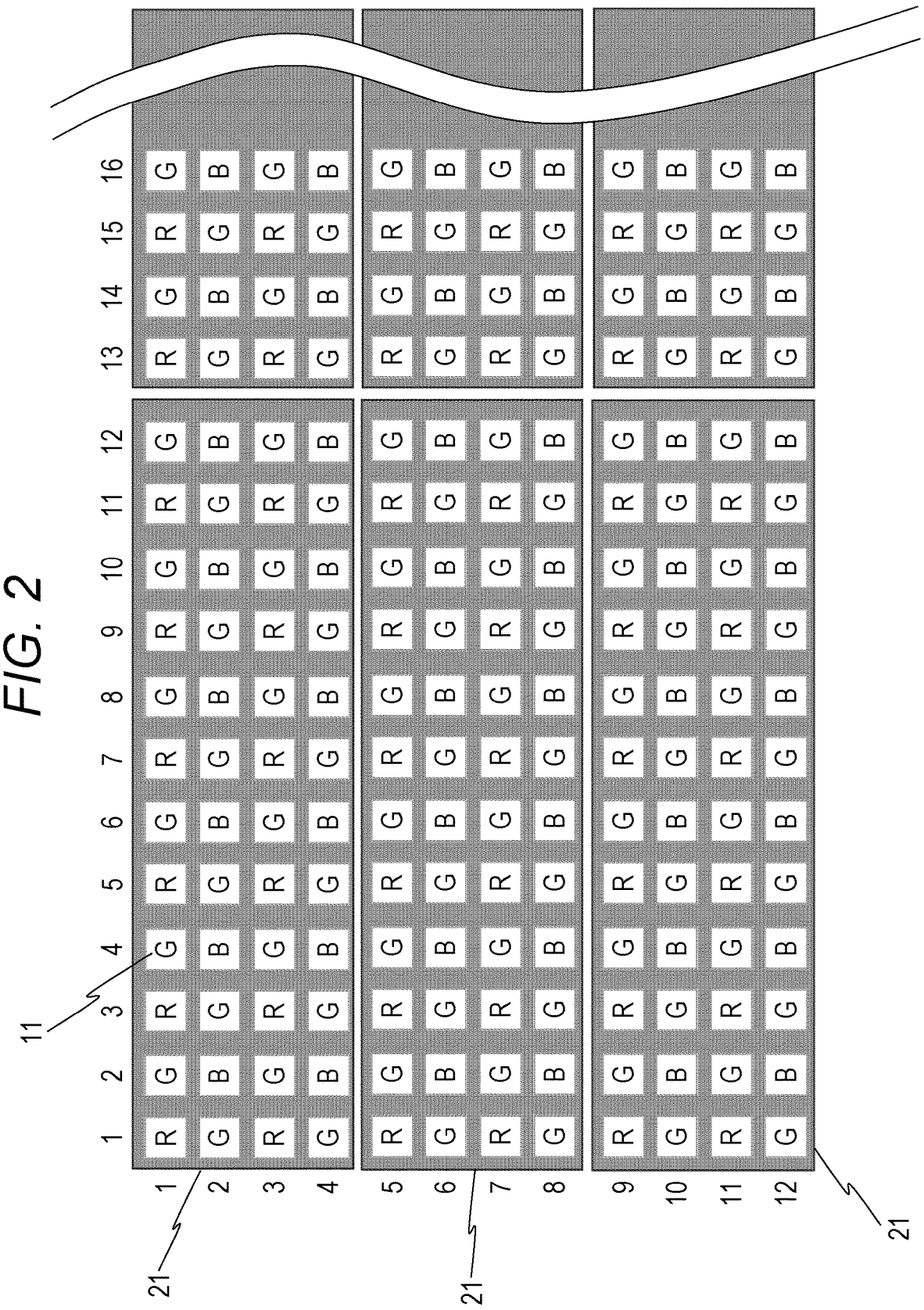
FIG. 2 is a view of layout of pixels and signal processing circuits of the imaging device as viewed in the plane.

FIG. 2 is a view of the layout of the pixels 11 provided at the first chip 1 and the signal processing circuits 21 provided at the second chip 5. FIG. 2 also illustrates the color of a color filter provided at each pixel 11. R illustrated in FIG. 2 indicates that the pixel 11 includes a color filter of red (R). Similarly, G and B each indicate that the pixels 11 have color filters of green (G) and blue (B).

In other words, it can be said that pixels into which light with a wavelength corresponding to a first color enters and pixels into which light with a wavelength corresponding to a second color enters are provided.

Typically, a wavelength corresponding to red is 600 to 830 nm. Moreover, a wavelength corresponding to green is 500 to 600 nm. Further, a wavelength corresponding to blue is 360 to 500 nm.

The color of the color filter may be distinguished according to a peak wavelength at which the transmission rate of the color filter is peak. Typically, a peak wavelength for the transmission rate of the color filter of blue is about 450 nm. Moreover, a peak wavelength for the transmission rate of the color filter of green is about 540 nm. Further, a peak wavelength for the transmission rate of the color filter of red is about 630 nm.

The color filter of the single pixel 11 may include a single color filter member. Alternatively, an example may be employed, in which the color filter of the single pixel 11 includes color filter members with different compositions within such a range that one portion and the other portions of a region where the color filter is provided are taken as the substantially same color.

The single signal processing circuit 21 is arranged to overlap with the pixels 11 arranged in multiple rows and multiple columns. The single signal processing circuit 21 described herein is arranged to overlap with the pixels 11 in four rows and 12 columns. Although described later, the signal processing circuit 21 has a multiplex circuit and an AD conversion circuit. Thus, it can be said that one or both of the multiplex circuit and the AD conversion circuit of the single signal processing circuit 21 are arranged to overlap with the pixels 11.

Although described later, the AD conversion circuit of the single signal processing circuit 21 is configured to AD-convert the signal output from the pixel 11 with the color filter of the first color and not to AD-convert the signal output from the pixel 11 with the color filter of the second color. Thus, one or both of the AD conversion circuit and the multiplex circuit of the single signal processing circuit 21 are in such a relationship that one or both of the AD conversion circuit and the multiplex circuit overlap with both of the pixel 11 targeted for AD conversion and the pixel 11 not targeted for AD conversion as viewed in plane.

Note that such layout is one example, and the present exemplary embodiment can employ a form in which the pixels 11 in multiple rows and multiple columns are arranged for the single signal processing circuit 21.

(Configuration of Imaging Device)

Figure 3:
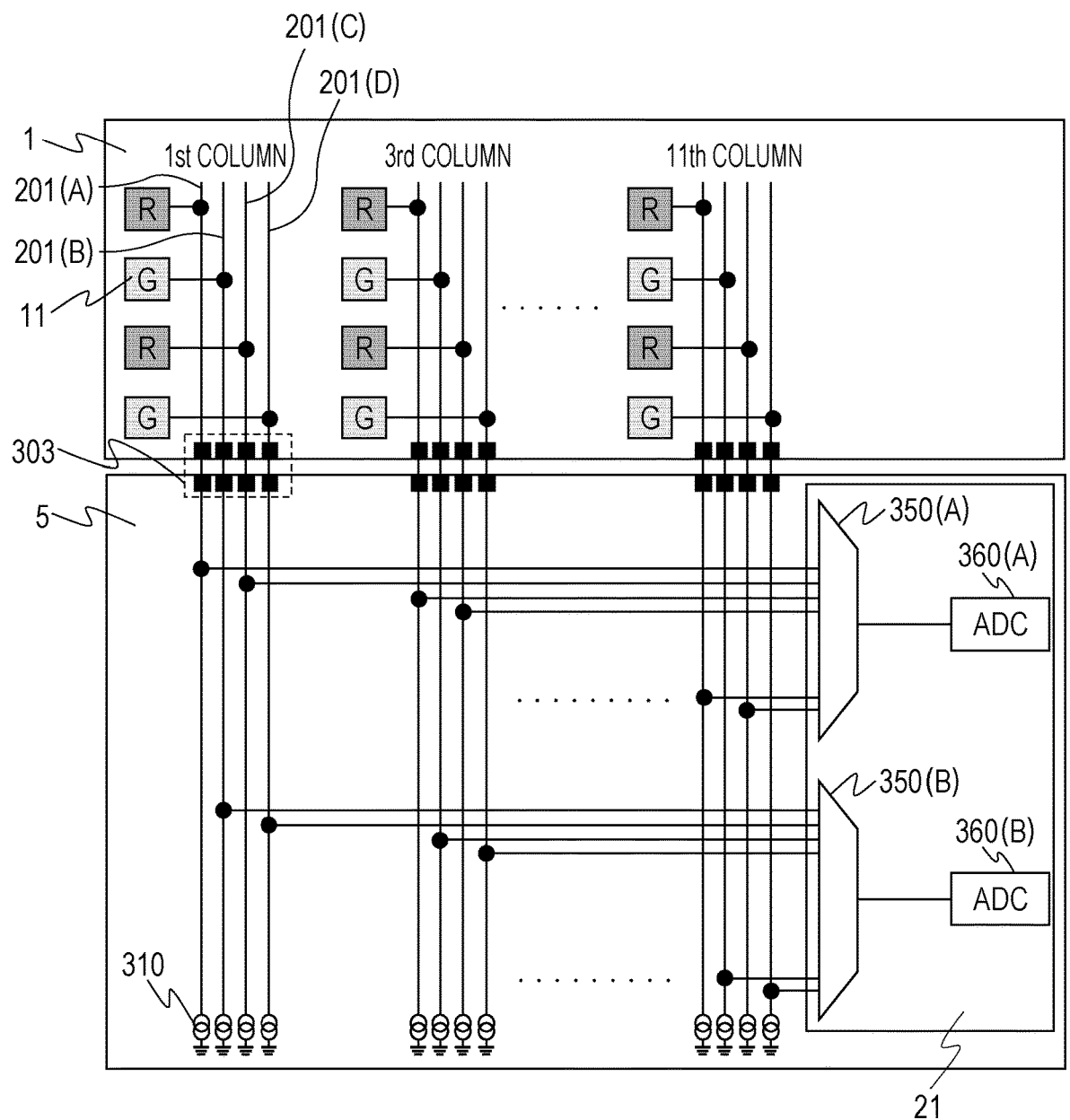
FIG. 3 is a diagram of an equivalent circuit of the pixels and the signal processing circuits.

FIG. 3 is a block diagram of the imaging device illustrated in FIGS. 1 and 2. FIG. 3 only illustrates the pixels 11 in odd-numbered columns among the pixels 11 illustrated in FIG. 2. For each column of the pixels 11 of the first chip 1, four signal lines 201(A) to 201(D) are provided. Note that in a case where the signal lines 201(A) to 201(D) are expressed without distinction, the signal lines 201(A) to 201(D) will be hereinafter merely expressed as "signal lines 201". The first row of the pixels 11 is connected to the signal line 201(A). Similarly, the second to fourth rows of the pixels 11 are sequentially connected to the signal lines 201(B) to 201(D). In other columns, the signal lines 201(A) to 201(D) are also arranged in a similar manner to those of the first column of the pixels 11.

Each of the signal lines 201(A) and 201(C) is, via a connection portion 303, connected to a multiplex circuit (hereinafter expressed as a "MPX circuit") 350(A) provided at the signal processing circuit 21. Moreover, the signal processing circuit 21 has AD conversion circuits (hereinafter expressed as "ADC" in the specification and the drawings) 360(A) and 360(B). The MPX circuit 350(A) is a first selection unit including an input unit connected to the signal lines 201(A) and 201(C) and an output unit connected to the ADC 360(A).

Each of the signal lines 201(B) and 201(D) is, via a connection portion 303, connected to a MPX circuit 350(B) provided at the signal processing circuit 21. The MPX circuit 350(B) is a second selection unit including an input unit connected to the signal lines 201(B) and 201(D) and an output unit connected to the ADC 360(B).

As illustrated in FIG. 3, all of the pixels 11 connected to the ADC 360(A) are the pixels 11 including the color filters of R. On the other hand, all of the pixels 11 connected to the ADC 360(B) are the pixels 11 including the color filters of G. As described above, the multiple first pixels 11 each including the color filters of the first color (R) are not connected to the ADC 360(B) as a second AD conversion unit, but are connected to the ADC 360(A) as a first AD conversion unit. Moreover, the multiple first pixels 11 each including the color filters of the second color (G) are not connected to the ADC 360(A) as the first AD conversion unit, but are connected to the ADC 360(B) as the second AD conversion unit.

Moreover, as illustrated in FIG. 3, the second chip 5 has current sources 310. Each current source 310 is configured to supply current to the signal line 201 of a corresponding one of the columns via the connection portion 303.

(Section Structure Around Connection Portion of Imaging Device)

Figure 4:
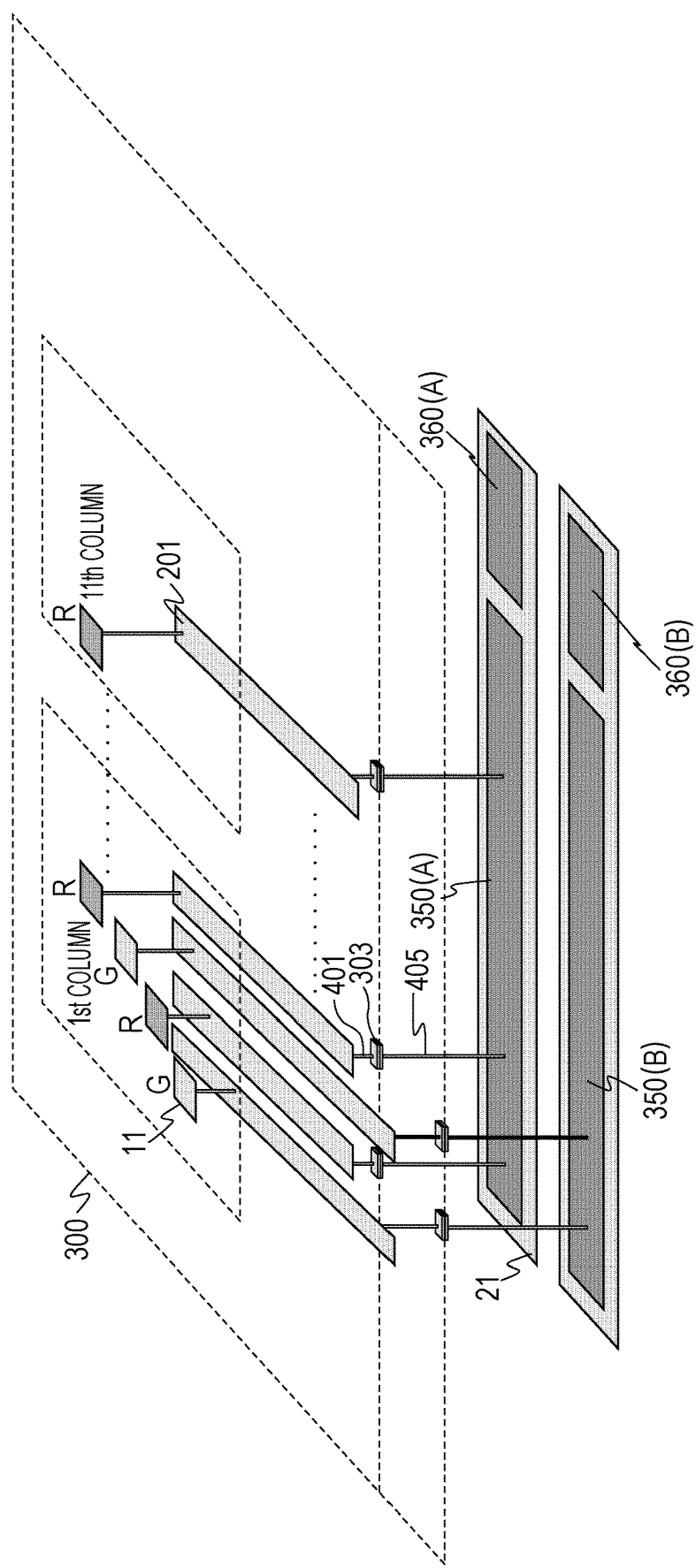
FIG. 4 is a view of connection among the pixels and the signal processing circuits.

FIG. 4 is a perspective view of the imaging device illustrated in FIG. 3. FIG. 4 mainly illustrates the pixel 11 arranged at the fourth row and the first column and the pixel 11 arranged at the first row and the eleventh column. The first chip 1 and the second chip 5 illustrated in FIG. 1 are joined together at a joint surface 300.

Figure 5:
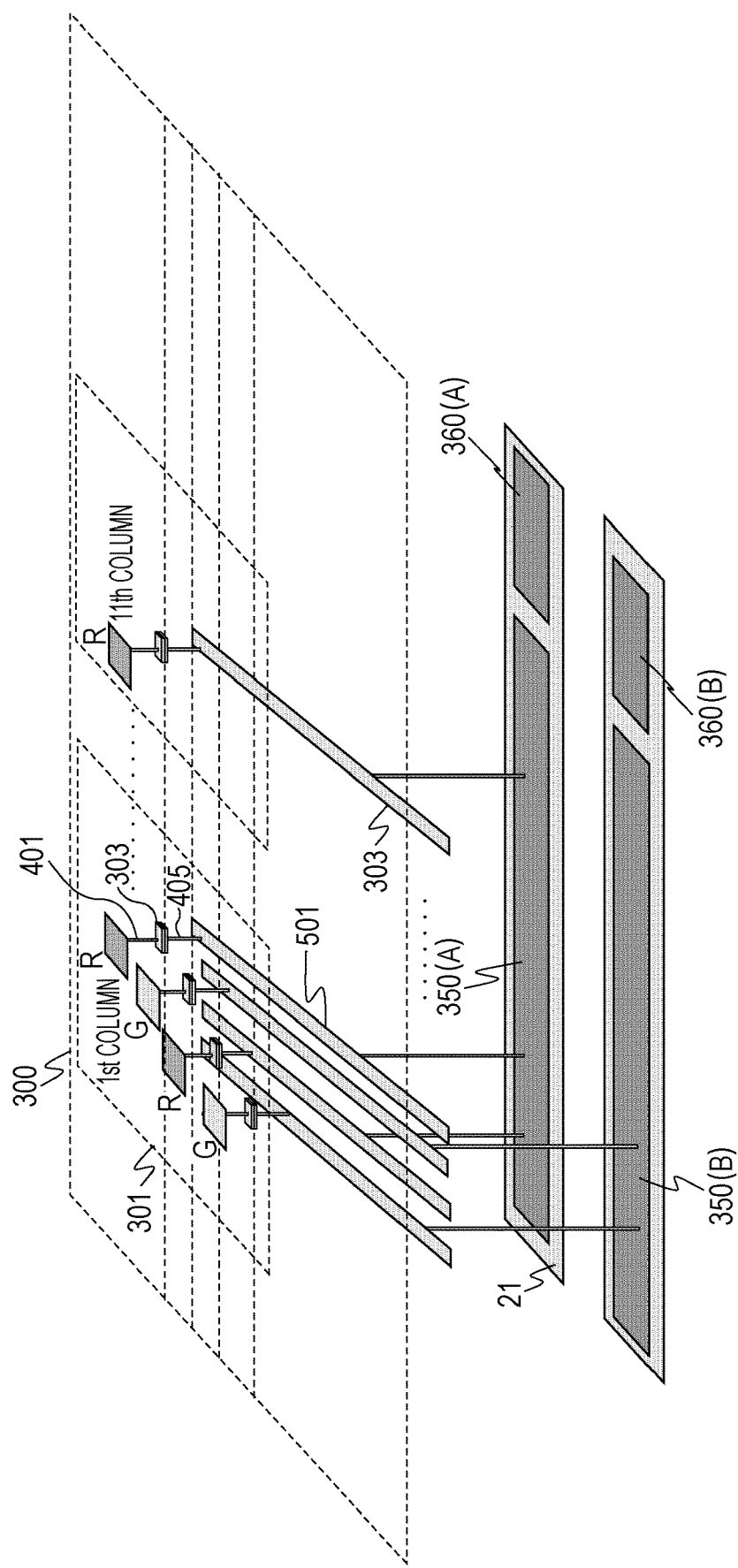
FIG. 5 is a view of connection among the pixels and the signal processing circuits.

The imaging device of the present exemplary embodiment is a back-side illuminated imaging device. Each pixel 11 includes a not-shown photoelectric conversion unit. The signal line 201 is provided between the photoelectric conversion unit and the joint surface 300. The signal line 201 extends in a predetermined direction of the pixel 11 (in the figure, a direction along the column). The signal line 201 is connected to the connection portion 303 via a connection wiring 401. Moreover, the MPX circuit 350(A) is connected to the connection portion 303 via a connection wiring 405. The connection wiring 401, the connection wiring 405, and the connection portion 303 are arranged to overlap with each other as viewed in the plane. It can be also said that connection between the signal processing circuit 21 and the signal line 201 is made in such a manner that the connection wiring 401 is formed at a position overlapping with the connection wiring 405 as viewed in the plane. By connection between the signal line 201 extending along the predetermined direction and the connection wiring 401, the signal line 201 and the MPX circuit 350 can be connected to each other. The signal line 201 extends in the predetermined direction so that connection between the connection wiring 401 and the signal line 201 can be facilitated. Other examples may include an example where signal lines 501 extending in the predetermined direction are provided not at the first chip 1 but at the second chip 5 as illustrated in FIG. 5. In this case, the pixel 11 and the MPX circuit 350(A) can be connected to each other. However, as compared to FIG. 5, the signal lines extending in the predetermined direction are preferably provided at the first chip 1 as illustrated in FIG. 4. This is because more wiring layers are present in the second chip 5 provided with the signal processing circuits 21 than in the first chip 1 provided with the pixels 11. The degree of freedom in designing is higher in a case where the signal lines 201 are provided at the first chip 1 with fewer wiring layers as in FIG. 4 than a case where the signal lines 501 are provided at the second chip 5 with more wiring layers as in FIG. 5.

(Equivalent Circuit of Pixel)

Figure 6:
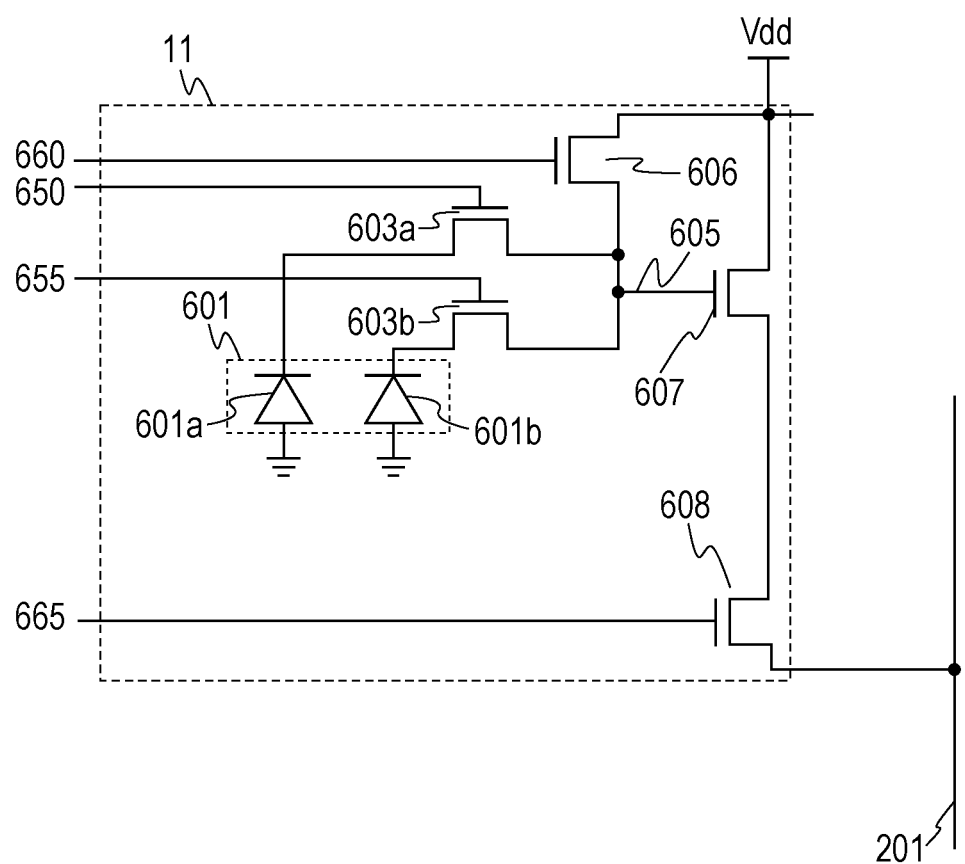
FIG. 6 is a diagram of an equivalent circuit of the pixel.

FIG. 6 is an equivalent circuit diagram of the pixel 11 of the present exemplary embodiment. The pixel 11 has photodiodes 601*a* and 601*b* as the photoelectric conversion units. Light transmitted through a not-shown single microlens and the color filter provided according to arrangement illustrated in FIG. 2 enters the photodiodes 601*a* and 601*b*. That is, the light entering the photodiode 601*a* and the light entering the photodiode 601*b* have the substantially same light wavelength.

The photodiode 601*a* is connected to a floating diffusion portion (hereinafter referred to as an "FD portion") 605 via a transfer transistor 603*a*. Moreover, a gate of the transfer transistor 603*a* is connected to the not-shown vertical scanning circuit via a control line 650.

The photodiode 601*b* is connected to the floating diffusion portion (hereinafter referred to as the "FD portion") 605 via a transfer transistor 603*b*. Moreover, a gate of the transfer transistor 603*b* is connected to the not-shown vertical scanning circuit via a control line 655.

The FD portion 605 is connected to a reset transistor 606 and a gate of an amplification transistor 607.

A power source voltage Vdd is supplied to the reset transistor 606 and the amplification transistor 607. A gate of the reset transistor 606 is connected to the not-shown vertical scanning circuit via a control line 660.

The amplification transistor 607 is connected to a selection transistor 608. A gate of the selection transistor 608 is connected to the not-shown vertical scanning circuit via a control line 665.

The selection transistor 608 is connected to the signal line 201.

The vertical scanning circuit also serves as a control unit configured to control the order of signals targeted for AD conversion of the ADC 360.

(Operation of Imaging Device: Imaging Mode)

FIGS. 7A and 7B are a chart of operation of the imaging device including the pixels 11 illustrated in FIG. 6. In operation of FIGS. 7A and 7B, the pixels 11 do not output focus detection signals, and output imaging signals. That is, the pixels 11 do not output first signals based on photodiode signals from only some of the multiple photodiodes, and output second signals based on the signals from the multiple photodiodes.

A signal PRES of FIGS. 7A and 7B indicates a signal supplied from the vertical scanning circuit to the gate of the reset transistor 606 via the control line 660 of FIG. 6. Similarly, a signal PSEL indicates a signal supplied from the vertical scanning circuit to the gates of the selection transistors 608 of the Nth row pixels 11 via the control line 665. Note that for the signal PSEL, the row position of the pixel 11 to which the signal PSEL is output is also indicated at the end. That is, the signal PSEL(1) indicates the signal PSEL output to the first row pixels 11. A signal PTXA indicates a signal supplied from the vertical scanning circuit to the gate of the transfer transistor 603*a* via the control line 650. A signal PTXB indicates a signal supplied from the vertical scanning circuit to the gate of the transfer transistor 603*b* via the control line 655.

FIGS. 7A and 7B illustrate operation regarding the MPX circuit 350(A) and the ADC 360(A). As illustrated in FIG. 3, the signals of the pixels 11 including the color filters of R and positioned at the first and third rows and the odd-numbered columns of the first to twelfth columns are input to the MPX circuit 350(A) and the ADC 360(A). Thus, FIGS. 7A and 7B illustrate operation regarding operation of the pixels 11 positioned at the first and third rows and the odd-numbered columns of the first to twelfth columns.

Moreover, FIGS. 7A and 7B illustrate, as Col_nm, the column selected by the MPX circuit 350(A) as the column outputting the signals to the ADC 360(A). An expression of nm will be described, "n" indicating the column number of the pixel 11 and "m" indicating an alphabet of one of the signal lines 201(A) to 201(D) arranged corresponding to the pixels 11 of the single column. That is, in the case of Col_1A, such expression indicates the signal line 201(A) corresponding to the pixels 11 of the first column.

At a time point t1, the vertical scanning circuit brings the signal PRES output to the pixels 11 of the first and third rows into a High level. Thus, the reset transistors 606 of the pixels 11 of the first row are ON. Accordingly, each FD portion 605 is reset to a potential corresponding to the power source voltage Vdd. Moreover, at the time point t1, the vertical scanning circuit brings the signal PSEL(1) into the High level. Thus, the selection transistors 608 of the pixels 11 of the first row are ON. Accordingly, current supplied from the current sources 310 illustrated in FIG. 3 is supplied to the amplification transistors 607 via the selection transistors 608 of the pixels 11 of the first row. In this manner, a source follower circuit is formed by the power source voltage Vdd, the amplification transistor 607, and the current source 310. That is, the amplification transistor 607 performs the source follower operation of outputting the signal corresponding to the potential of the FD portion 605 to the signal line 201 via the selection transistor 608.

(Operation: Reading of N Signals Corresponding to Pixels 11 of First Row)

At a time point t2, the vertical scanning circuit brings the signal PRES output to the pixels 11 of the first row into a Low level. Thus, the reset transistors 606 of the pixels 11 of the first row are OFF. Accordingly, reset of the FD portions 605 is canceled. The amplification transistors 607 output, to the signal lines 201(A) illustrated in FIG. 3, signals based on the potentials of the FD portions 605 subjected to reset cancellation. These signals are expressed as N signals (noise signals). Thus, the N signal is output from the pixel 11 to the signal line 201(A) of each column.

(Operation: AD Conversion of N Signals Corresponding to Pixels 11 of First Row)

From the time point t2 onward, the MPX circuit 350(A) sequentially connects, according to a signal MPX supplied from the timing generator, the signal lines 201(A) corresponding to the pixels 11 of the odd-numbered columns of the first to twelfth columns to the ADC 360(A).

The ADC 360(A) AD-converts the noise signal of the signal line 201(A) of the first column into a digital signal, the noise signal being output from the MPX circuit 350(A). Thereafter, the noise signals output to the signal lines 201(A) corresponding to the pixels 11 of the odd-numbered columns of the first to twelfth columns are sequentially AD-converted into digital signals.

(Operation: Reading of N Signals Corresponding to Pixels 11 of Third Row)

At a time point t16, the vertical scanning circuit brings the signals output to the pixels 11 of the third row into the Low level. Thus, the reset transistors 606 of the pixels 11 of the third row are OFF. Accordingly, reset of the FD portions 605 is canceled. The amplification transistors 607 output, to the signal lines 201(C) illustrated in FIG. 3, N signals as signals based on the potentials of the FD portions 605 subjected to reset cancellation. Thus, the noise signal is output from the pixel 11 to the signal line 201(C) of each column.

(Operation: AD Conversion of N Signals Corresponding to Pixels 11 of Third Row)

From the time point t16 onward, the MPX circuit 350(A) sequentially connects, according to the signal MPX supplied from the timing generator, the signal lines 201(C) corresponding to the pixels 11 of the odd-numbered columns of the first to twelfth columns to the ADC 360(A).

The ADC 360(A) AD-converts the N signal of the signal line 201(C) of the first column into a digital signal, the N signal being output from the MPX circuit 350(A). Thereafter, the N signals output to the signal lines 201(C) corresponding to the pixels 11 of the odd-numbered columns of the first to twelfth columns are sequentially AD-converted into digital signals.

(Operation: Reading of A+B Signals Corresponding to Pixels 11 of First Row)

At the time point t16, the vertical scanning circuit brings the signals PTXA and PTXB output to the pixels 11 of the first row into the High level. Thus, electric charges (electrons in the present exemplary embodiment) accumulated by the photodiodes 601a and 601b are transferred to the FD portion 605 via the transfer transistors 603a and 603b. In the FD portion 605, the electric charges of the photodiodes 601a and 601b are added up. Thus, the FD portion 605 has the potential corresponding to the electric charge obtained by adding up the electric charges of the photodiodes 601a and 601b. Suppose that a signal output from the amplification transistor 607 based on the potential of the FD portion 605 corresponding to only the electric charge of the photodiode 601a is an A signal. Moreover, suppose that a signal output from the amplification transistor 607 based on the potential of the FD portion 605 corresponding to only the electric charge of the photodiode 601b is an B signal. According to such an expression, a signal output from the amplification transistor 607 based on the potential of the FD portion 605 corresponding to the electric charge obtained by adding up the electric charges of the photodiodes 601a and 601b can be taken as an A+B signal obtained by adding up the A signal and the B signal. The A+B signal of the pixel 11 of the first row is output to the signal line 201(A) of each column. The A+B signal is the second signal based on the signals generated by the multiple photodiodes. The second signal can be used as the imaging signal.

(Operation: AD Conversion of A+B Signals Corresponding to Pixels 11 of First Row)

From a time point t30 onward, the MPX circuit 350(A) sequentially connects, according to the signal MPX supplied from the timing generator, the signal lines 201(A) corresponding to the pixels 11 of the odd-numbered columns of the first to twelfth columns to the ADC 360(A).

The ADC 360(A) AD-converts the A+B signal of the signal line 201(A) of the first column into a digital signal, the A+B signal being output from the MPX circuit 350(A). Thereafter, the A+B signals output to the signal lines 201(A) corresponding to the pixels 11 of the odd-numbered columns of the first to twelfth columns are sequentially AD-converted into digital signals.

(Operation: Reading of A+B Signals Corresponding to Pixels 11 of Third Row)

At the time point t30, the vertical scanning circuit brings the signals PTXA and PTXB output to the pixels 11 of the third row into the High level. Thus, the A+B signal of the pixel 11 of the third row is output to the signal line 201(C) of each column.

(Operation: AD Conversion of A+B Signals Corresponding to Pixels 11 of Third Row)

From a time point t44 onward, the MPX circuit 350(A) sequentially connects, according to the signal MPX supplied from the timing generator, the signal lines 201(C) corresponding to the pixels 11 of the odd-numbered columns of the first to twelfth columns to the ADC 360(A).

The ADC 360(A) AD-converts the A+B signal of the signal line 201(C) of the first column into a digital signal, the A+B signal being output from the MPX circuit 350(A). Thereafter, the A+B signals output to the signal lines 201(C) corresponding to the pixels 11 of the odd-numbered columns of the first to twelfth columns are sequentially AD-converted into digital signals.

(Further Advantageous Effects of the Present Exemplary Embodiment: Parallel Operation by Imaging Device in Operation of FIGS. 7A and 7B)

Characteristic advantageous effects of the present exemplary embodiment will be separately described later. Advantageous effects different from these advantageous effects will be described first.

In operation illustrated in FIGS. 7A and 7B, multiple types of operation are performed in parallel as follows:

(1) parallel operation of AD conversion of the N signals corresponding to the pixels 11 of the first row and reading of the N signals corresponding to the pixels 11 of the third row;

(2) parallel operation of AD conversion of the N signals corresponding to the pixels 11 of the third row and reading of the A+B signals corresponding to the pixels 11 of the first row; and (3) parallel operation of AD conversion of the A+B signals corresponding to the pixels 11 of the first row and reading of the A+B signals corresponding to the pixels 11 of the third row.

By such parallel operation, a waiting time until subsequent AD conversion is performed after the ADC 360(A) has completed AD conversion once can be shortened. Thus, a period required for AD conversion of the signals output from all pixels 11 can be shortened. Consequently, enhancement of the frame rate of the imaging device can be progressed.

(Operation of Imaging Device: Focus Detection+Imaging Mode)

FIGS. 8A and 8B are a chart of another type of operation of the imaging device including the pixels 11 illustrated in FIG. 6. In operation in FIGS. 8A and 8B, the pixels 11 output the focus detection signals and the imaging signals. That is, the pixels 11 output the first signals based on the signals of only some of the multiple photodiodes and the second signals based on the signals of the multiple photodiodes.

A photoelectric conversion period corresponding to the A signal is in such a relationship that the photoelectric conversion period corresponding to the A signal at least partially overlaps with a photoelectric conversion period corresponding to the A+B signal. That is, such an overlap is shown in at least a period from a time point t70 to a time point t74, referring to FIGS. 8A and 8B. In fact, the overlap is shown in a period until the electric charge of the photodiode 601a is transferred to the FD portion 605 after the photodiode reset for resetting the electric charges of the photodiodes 601a, 601b has been performed, the photodiode reset being performed before the time point t70.

Operation until a time point t72 can be the same as operation until the time point t16 described with reference to FIGS. 7A and 7B.

(Reading of A signals Corresponding to Pixels 11 of First Row)

At the time point t72, the vertical scanning circuit brings the signal PTXA output to the pixels 11 of the first row into the High level. Thus, the electric charge accumulated by the photodiode 601a is transferred to the FD portion 605 via the transfer transistor 603a. Accordingly, the FD portion 605 has the potential corresponding to the electric charge of the photodiode 601a. The A signal of the pixel 11 of the first row is output to the signal line 201(A) of each column. The A signal is the first signal based on the signals of only some of the multiple photodiodes. The first signal can be used as the focus detection signal.

(Operation: AD Conversion of A Signals Corresponding to Pixels 11 of First Row)

From the time point t74 onward, the MPX circuit 350(A) sequentially connects, according to the signal MPX supplied from the timing generator, the signal lines 201(A) corresponding to the pixels 11 of the odd-numbered columns of the first to twelfth columns to the ADC 360(A).

The ADC 360(A) AD-converts the A signal of the signal line 201(A) of the first column into a digital signal, the A signal being output from the MPX circuit 350(A). Thereafter, the A signals output to the signal lines 201(A) corresponding to the pixels 11 of the odd-numbered columns of the first to twelfth columns are sequentially AD-converted into digital signals.

(Operation: Reading of A Signals Corresponding to Pixels 11 of Third Row)

At the time point t74, the vertical scanning circuit brings the signal PTXA output to the pixels 11 of the third row into the High level. Thus, the A signal of the pixel 11 of the third row is output to the signal line 201(C) of each column.

(Operation: AD Conversion of A+B Signals Corresponding to Pixels 11 of Third Row)

From a time point t76 onward, the MPX circuit 350(A) sequentially connects, according to the signal MPX supplied from the timing generator, the signal lines 201(C) corresponding to the pixels 11 of the odd-numbered columns of the first to twelfth columns to the ADC 360(A).

The ADC 360(A) AD-converts the A signal of the signal line 201(C) of the first column into a digital signal, the A signal being output from the MPX circuit 350(A). Thereafter, the A signals output to the signal lines 201(C) corresponding to the pixels 11 of the odd-numbered columns of the first to twelfth columns are sequentially AD-converted into digital signals.

(Operation: Reading of A+B Signals Corresponding to Pixels 11 of First Row)

Before the time point t76, the electric charge generated by the photodiode 601a is held at the FD portion 605 of each pixel 11 of the first row because the signal PTXA changes from the High level to the Low level at the time point t74.

At the time point t76, the vertical scanning circuit brings the signals PTXA and PTXB output to the pixels 11 of the first row into the High level in a state in which each FD portion 605 holds the electric charge of the photodiode 601a. The electric charge accumulated by the photodiode 601b and the electric charge accumulated by the photodiode 601a from the time point t74 to the time point t76 are transferred to the FD portion 605 via the transfer transistors 603a and 603b. In the FD portion 605, the electric charges of the photodiodes 601a and 601b are added up. Thus, the FD portion 605 has the potential corresponding to the electric charge obtained by adding up the electric charges of the photodiodes 601a and 601b. The A+B signal of the pixel 11 of the first row is output to the signal line 201(A) of each column.

(Operation: AD Conversion of A+B Signals Corresponding to Pixels 11 of First Row)

From a time point t78 onward, the MPX circuit 350(A) sequentially connects, according to the signal MPX supplied from the timing generator, the signal lines 201(A) corresponding to the pixels 11 of the odd-numbered columns of the first to twelfth columns to the ADC 360(A).

The ADC 360(A) AD-converts the A+B signal of the signal line 201(A) of the first column into a digital signal, the A+B signal being output from the MPX circuit 350(A). Thereafter, the A+B signals output to the signal lines 201(A) corresponding to the pixels 11 of the odd-numbered columns of the first to twelfth columns are sequentially AD-converted into digital signals.

(Operation: Reading of A+B Signals Corresponding to Pixels 11 of Third Row)

At the time point t78, the vertical scanning circuit brings the signals PTXA and PTXB output to the pixels 11 of the third row into the High level. Thus, the A+B signal of the pixel 11 of the third row is output to the signal line 201(C) of each column.

(Operation: AD Conversion of A+B Signals Corresponding to Pixels 11 of Third Row)

From a time point t80 onward, the MPX circuit 350(A) sequentially connects, according to the signal MPX supplied from the timing generator, the signal lines 201(C) corresponding to the pixels 11 of the odd-numbered columns of the first to twelfth columns to the ADC 360(A).

The ADC 360(A) AD-converts the A+B signal of the signal line 201(C) of the first column into a digital signal, the A+B signal being output from the MPX circuit 350(A). Thereafter, the A+B signals output to the signal lines 201(C)

corresponding to the pixels 11 of the odd-numbered columns of the first to twelfth columns are sequentially AD-converted into digital signals.

(Advantageous Effects of Imaging Device of the Present Exemplary Embodiment)

Characteristic advantageous effects of the imaging device of the present exemplary embodiment will be described.

The imaging device of the present exemplary embodiment AD-converts the A signal of each pixel 11 of the second row before the A+B signal of each pixel 11 of the first row is AD-converted and after the A signal of each pixel 11 of the first row has been AD-converted. In AD conversion of the A signal and AD conversion of the A+B signal, there is a change in an operation mode of the ADC 360 such as a change in a correction parameter. In the case of this configuration, a waiting time for the control of switching a bit number is caused, or a change in the correction parameter due to a change in operation of the ADC 360 is caused. A change in the correction parameter includes, for example, a correction parameter of a reference voltage VRF in the case of a successive approximation comparator described later in a fourth exemplary embodiment. AD conversion of the signal of each pixel 11 of two rows will be focused herein. In this case, the total of three changes in the operation mode is necessary between AD conversion of the A signals of the first row and AD conversion of the A+B signals of the first row, between AD conversion of the A+B signals of the first row and AD conversion of the A signals of the second row, and between AD conversion of the A signals of the second row and the AD conversion of the A+B signals of the second row. When the number of pixel rows targeted for AD conversion is N rows, the processing of changing the operation mode needs to be performed 2N−1 times. If N=8, the operation mode needs to be changed 15 times. On the other hand, in the present exemplary embodiment, the A signal of each pixel 11 of the second row is AD-converted before the A+B signal of each pixel 11 of the first row is AD-converted and after the A signal of each pixel 11 of the first row has been AD-converted. In such operation, when the number of signal lines 201 connected to the single ADC 360 is M, the operation mode is changed (N/M)−1+(N/M)=(2N/M)−1 (times). In the present exemplary embodiment, the operation mode is changed three times because of N=8 and M=4. That is, after the A signals of the pixels 11 of the first to fourth rows have been sequentially AD-converted, the operation mode is changed (a first change), and the A+B signals of the first to fourth rows are sequentially AD-converted. Then, the operation mode is changed (a second change), and the A signals of the pixels 11 of the fifth to eighth rows are sequentially AD-converted. Then, the operation mode is changed (a third change), and the A+B signals of the fifth to eighth rows are sequentially AD-converted. Thus, in the case of sequentially AD-converting the A signals and the A+B signals of the pixels 11 of the first row, the operation mode needs to be changed 15 times. On the other hand, in the form of the present exemplary embodiment, the operation mode is changed only three times. As described above, it can be said that a reading method in the present exemplary embodiment is a reading method suitable for a change in the operation mode in AD conversion of the A signal and the A+B signal.

(Further Advantageous Effects of the Present Exemplary Embodiment: Parallel Operation by Imaging Device in Operation of FIGS. 8A and 8B)

In operation illustrated in FIGS. 8A and 8B, multiple types of operation are performed in parallel as follows:

(1) parallel operation of AD conversion of the N signals corresponding to the pixels 11 of the first row and reading of the N signals corresponding to the pixels 11 of the third row;

(2) parallel operation of AD conversion of the N signals corresponding to the pixels 11 of the third row and reading of the A signals corresponding to the pixels 11 of the first row;

(3) parallel operation of AD conversion of the A signals corresponding to the pixels 11 of the first row and reading of the A signals corresponding to the pixels 11 of the third row;

(4) parallel operation of AD conversion of the A signals corresponding to the pixels 11 of the third row and reading of the A+B signals corresponding to the pixels 11 of the first row; and (5) parallel operation of AD conversion of the A+B signals corresponding to the pixels 11 of the first row and reading of the A+B signals corresponding to the pixels 11 of the third row.

Specifically, the imaging device of the present exemplary embodiment performs operation of (4). By such parallel operation, the waiting time until subsequent AD conversion is performed after the ADC 360(A) has completed AD conversion once can be shortened. Specifically, the A+B signal is the signal corresponding to the addition electric charge obtained by adding up the electric charges of the multiple photodiodes, and therefore, tendency shows that an amplitude is greater than that of the A signal. Thus, tendency shows that a time required for stabilizing the signal is longer in the case of outputting the A+B signal to the signal line 201 than in the case of outputting the A signal to the signal line 201. For this reason, reading of the A+B signals, which take a time to stabilize, of the first row to the signal line 201 overlaps with a period for performing AD conversion of the A signals of the second row. In this manner, control of an operation speed of the imaging device according to the period for reading the A+B signals, which take a time to stabilize, of the first row to the signal line 201 can be less caused.

With this configuration, the period required for AD conversion of the signals output from all pixels 11 can be shortened. Thus, enhancement of the frame rate of the imaging device and high pixilation of the imaging device can be progressed.

(Further Advantageous Effects of the Present Exemplary Embodiment: ADC Corresponding to Color Filters of Pixels)

As described above, in the imaging device of the present exemplary embodiment, all of the pixels 11 connected to the single ADC 360(A) are the pixels 11 including the color filters of R. On the other hand, all of the pixels 11 connected to the ADC 360(B) are the pixels 11 including the color filters of G. As described above, the multiple first pixels 11 each including the color filters of the first color (R) are not connected to the ADC 360(B) as the second AD conversion unit, but are connected to the ADC 360(A) as the first AD conversion unit. Moreover, the multiple first pixels 11 each including the color filters of the second color (G) are not connected to the ADC 360(A) as the first AD conversion unit, but are connected to the ADC 360(B) as the second AD conversion unit.

With this configuration, the color of light corresponding to the signal to be AD-converted by the single ADC can be only one color. In an imaging device including multiple ADCs, correction processing in AD conversion or correction processing after AD conversion might be necessary in response to variation in AD conversion properties according to the ADC. The correction processing in AD conversion includes, for example, correction of a reference signal used by the ADC. Moreover, the correction processing after AD conversion includes, for example, correction of a digital signal. When there are multiple colors of light corresponding to the signal to be AD-converted by the single ADC, a correction parameter corresponding to each of the multiple colors needs to be prepared. This leads to a problem that correction in AD conversion and correction after AD conversion are complicated.

On the other hand, the imaging device of the present exemplary embodiment is configured such that the color of light corresponding to the signal to be AD-converted by the single ADC is only one color. With this configuration, the imaging device of the present exemplary embodiment has an advantageous effect that correction in AD conversion and correction after AD conversion can be simplified.

As described above, the imaging device of the present exemplary embodiment can provide an imaging device having a suitable connection relationship among pixels and AD conversion units in a case where the color filters of the first color are each arranged at the multiple first pixels and the color filters of the second color are each arranged at the multiple second pixels.

(Other Forms: Change in Color of Pixel to be AD-Converted by Single ADC per Frame)

In the present exemplary embodiment, the example where the signal line 201 connected to the pixels 11 provided with the color filters of the first color and not connected to the pixels 11 provided with the color filters of the second color are connected to the ADC 360 has been described. In this example, a form is employed, in which no connection portion connecting the ADC 360 and each pixel 11 provided with the color filter of the second color is provided.

Second Exemplary Embodiment

Differences of an imaging device of the present exemplary embodiment from that of the first exemplary embodiment will be mainly described.

Figure 9:
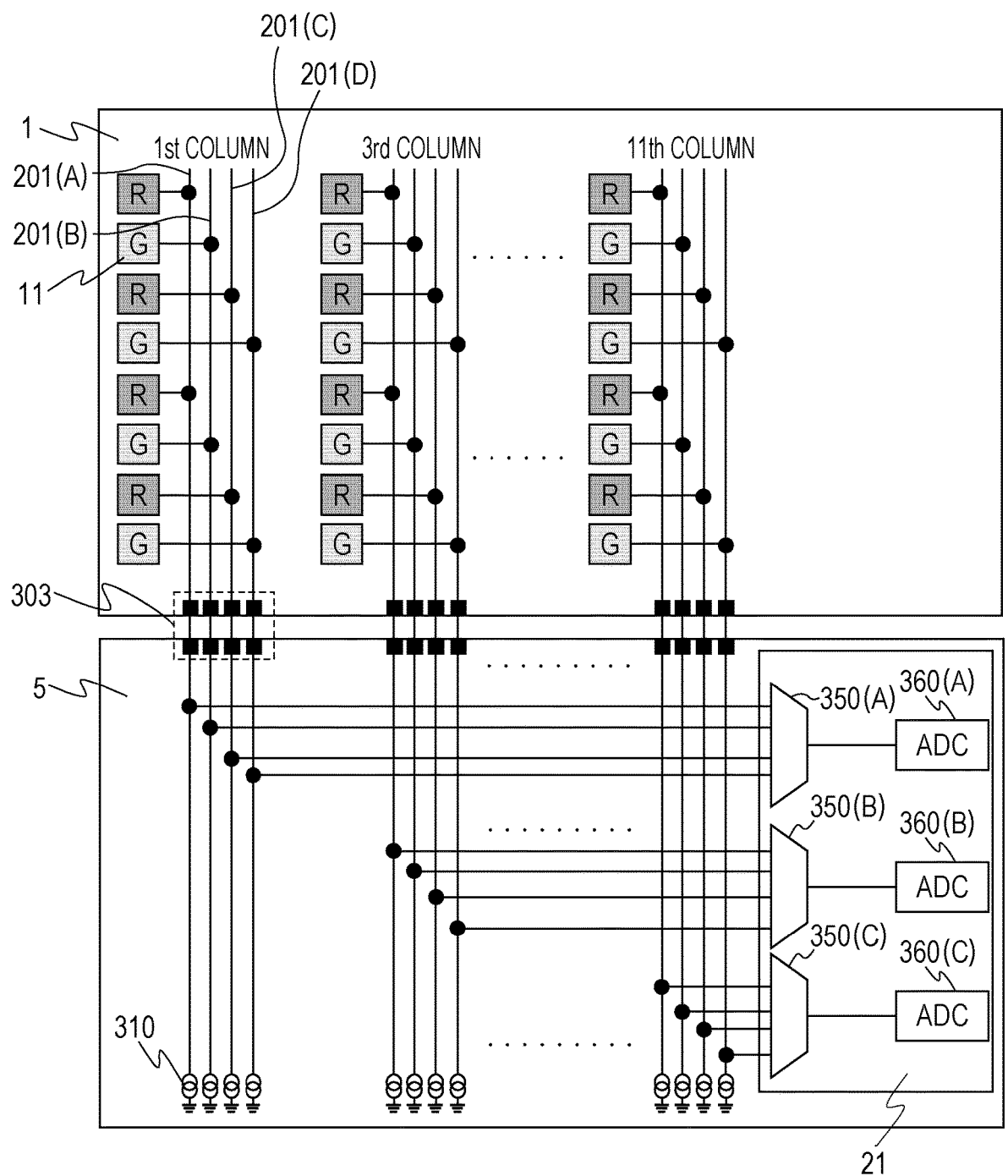
FIG. 9 is a view of connection among the pixels and the signal processing circuits.

FIG. 9 is a block diagram of the imaging device of the present exemplary embodiment. In the imaging device of the present exemplary embodiment, multiple signal lines 201 (A) to 201(D) are provided for pixels 11 of a single column. Moreover, the multiple signal lines 201(A) to 201(D) arranged corresponding to the pixels 11 of the single column are connected to a single MPX circuit 350(A). Output of the MPX circuit 350(A) is input to an ADC 360(A).

(Operation of Imaging Device: Imaging Mode)

Figure 10C:
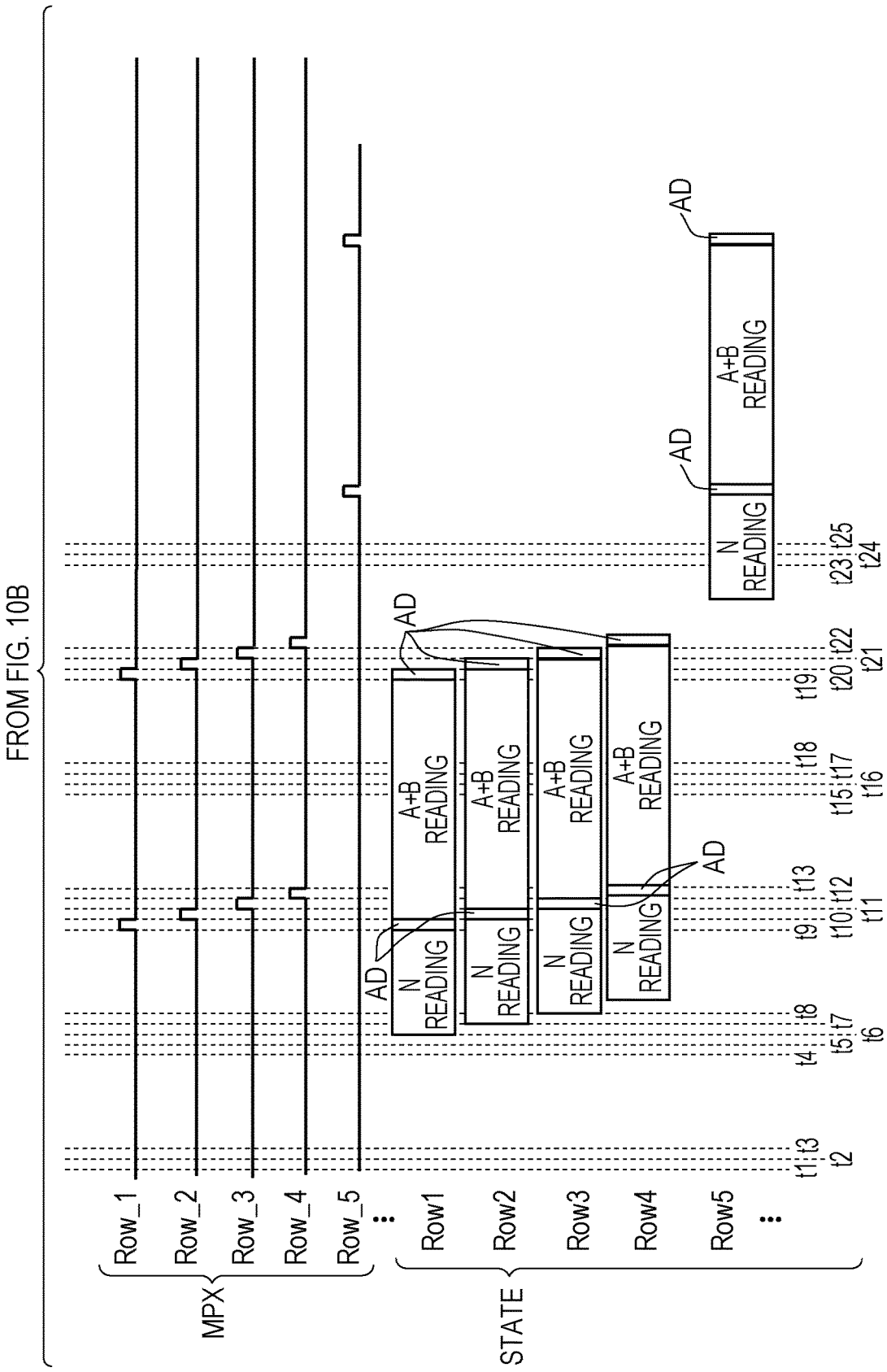

FIGS. 10A to 10C are a chart of operation of the imaging device illustrated in FIG. 9. Differences from operation of FIGS. 7A and 7B will be mainly described. Operation of FIGS. 10A to 10C is the operation of outputting an imaging signal by the imaging device.

The MPX circuit 350(A) illustrated in FIG. 9 sequentially outputs, to the ADC 360(A), signals of the multiple signal lines 201(A) to 201(D) arranged corresponding to the pixels 11 of the single column. FIGS. 10A to 10C illustrate, as Row_n, the signal output from the MPX circuit 350(A), "n" indicating a pixel row corresponding to the signal output from the MPX circuit 350(A) to the ADC 360(A). That is, when Row_1 is at a High level, such a signal indicates that the MPX circuit 350(A) outputs, to the ADC 360(A), the signal output from each pixel 11 of the first row to the signal line 201(A).

(Operation: Reading of N Signals from Pixels 11 of Each Row)

At a time point t1, a vertical scanning circuit brings a signal PSEL(1) output to the pixels 11 of the first row into the High level.

At a time point t2, the vertical scanning circuit brings the signal PSEL(2) output to the pixels 11 of the second row into the High level.

At a time point t3, the vertical scanning circuit brings the signal PSEL(3) output to the pixels 11 of the third row into the High level.

Similarly, the vertical scanning circuit subsequently brings the signal PSEL(4) output to the pixels 11 of the fourth row into the High level.

At a time point t5, the vertical scanning circuit brings a signal PRES output to the pixels 11 of the first row from the High level into a Low level. Accordingly, N signals are output to the signal lines 201(A).

At a time point t6, the vertical scanning circuit brings the signal PRES output to the pixels 11 of the second row from the High level into the Low level. Accordingly, N signals are output to the signal lines 201(B).

At a time point t7, the vertical scanning circuit brings the signal PRES output to the pixels 11 of the third row from the High level into the Low level. Accordingly, N signals are output to the signal lines 201(C).

At a time point t8, the vertical scanning circuit brings the signal PRES output to the pixels 11 of the fourth row from the High level into the Low level. Accordingly, N signals are output to the signal lines 201(D).

(Operation: AD Conversion of N Signals of Pixels 11 of Each Row)

At a time point t9, the MPX circuit 350(A) outputs the signal of each signal line 201(A), i.e., the N signal of each pixel 11 of the first row, to the ADC 360(A). The ADC 360(A) converts the N signal of each pixel 11 of the first row into a digital signal.

At a time point t10, the MPX circuit 350(A) outputs the signal of each signal line 201(B), i.e., the N signal of each pixel 11 of the second row, to the ADC 360(A). The ADC 360(A) converts the N signal of each pixel 11 of the second row into a digital signal.

At a time point t11, the MPX circuit 350(A) outputs the signal of each signal line 201(C), i.e., the N signal of each pixel 11 of the third row, to the ADC 360(A). The ADC 360(A) converts the N signal of each pixel 11 of the third row into a digital signal.

At a time point t12, the MPX circuit 350(A) outputs the signal of each signal line 201(D), i.e., the N signal of each pixel 11 of the fourth row, to the ADC 360(A). The ADC 360(A) converts the N signal of each pixel 11 of the fourth row into a digital signal.

(Operation: Reading of A+B Signals of Pixels 11 of Each Row)

At the time point t10, the vertical scanning circuit brings signals PTXA and PTXB output to the pixels 11 of the first row into the High level. Thus, electric charges accumulated by photodiodes 601a and 601b are transferred to an FD portion 605 via transfer transistors 603a and 603b. Accordingly, A+B signals of the pixels 11 of the first row are output to the signal lines 201(A).

At the time point t11, the vertical scanning circuit brings the signals PTXA and PTXB output to the pixels 11 of the second row into the High level. Thus, the electric charges accumulated by the photodiodes 601a and 601b are transferred to the FD portion 605 via the transfer transistors 603a and 603b. Accordingly, A+B signals of the pixels 11 of the second row are output to the signal lines 201(B).

At the time point t12, the vertical scanning circuit brings the signals PTXA and PTXB output to the pixels 11 of the third row into the High level. Thus, the electric charges accumulated by the photodiodes 601a and 601b are transferred to the FD portion 605 via the transfer transistors 603a and 603b. Accordingly, A+B signals of the pixels 11 of the third row are output to the signal lines 201(C).

At a time point t13, the vertical scanning circuit brings the signals PTXA and PTXB output to the pixels 11 of the fourth row into the High level. Thus, the electric charges accumulated by the photodiodes 601a and 601b are transferred to the FD portion 605 via the transfer transistors 603a and 603b. Accordingly, A+B signals of the pixels 11 of the fourth row are output to the signal lines 201(D).

(Operation: AD Conversion of A+B Signals of Pixels 11 of Each Row)

At a time point t19, the MPX circuit 350(A) outputs the signal of each signal line 201(A), i.e., the A+B signal of each pixel 11 of the first row, to the ADC 360(A). The ADC 360(A) converts the A+B signal of each pixel 11 of the first row into a digital signal.

At a time point t20, the MPX circuit 350(A) outputs the signal of each signal line 201(B), i.e., the A+B signal of each pixel 11 of the second row, to the ADC 360(A). The ADC 360(A) converts the A+B signal of each pixel 11 of the second row into a digital signal.

At a time point t21, the MPX circuit 350(A) outputs the signal of each signal line 201(C), i.e., the A+B signal of each pixel 11 of the third row, to the ADC 360(A). The ADC 360(A) converts the A+B signal of each pixel 11 of the third row into a digital signal.

At a time point t22, the MPX circuit 350(A) outputs the signal of each signal line 201(D), i.e., the A+B signal of each pixel 11 of the fourth row, to the ADC 360(A). The ADC 360(A) converts the A+B signal of each pixel 11 of the fourth row into a digital signal.

Thereafter, the vertical scanning circuit brings the signal PSEL(5) of each pixel 11 of the fifth row into the High level. Subsequently, similar operation is repeated.

As described above, the imaging device of the present exemplary embodiment can obtain the digital signal based on the N signal of each pixel and the digital signal based on the A+B signal of each pixel.

(Further Advantageous Effects of the Present Exemplary Embodiment: Speed-Up by Parallel Operation by Imaging Device in Operation of FIGS. 10A to 10C)

In operation illustrated in FIGS. 10A to 10C, multiple types of operation are performed in parallel as follows:

(1) parallel operation of reading of the N signals corresponding to the pixels 11 of the first row and reading of the N signals corresponding to the pixels 11 of the second row;

(2) parallel operation of AD conversion of the N signals corresponding to the pixels 11 of the first row and reading of the N signals corresponding to the pixels 11 of the second row;

(3) parallel operation of AD conversion of the N signals corresponding to the pixels 11 of the fourth row and reading of the A+B signals corresponding to the pixels 11 of the first row;

(4) parallel operation of reading of the A+B signals corresponding to the pixels 11 of the first row and reading of the A+B signals corresponding to the pixels 11 of the second row; and (5) parallel operation of AD conversion of the A+B signals corresponding to the pixels 11 of the first row and reading of the A+B signals corresponding to the pixels 11 of the second row.

By such parallel operation, a waiting time until subsequent AD conversion is performed after the ADC 360(A) has completed AD conversion once can be shortened. Thus, a period required for AD conversion of the signals output from all pixels 11 can be shortened. Consequently, enhancement of the frame rate of the imaging device can be progressed.

(Operation of Imaging Device: Focus Detection+Imaging Mode)

Figure 11C:
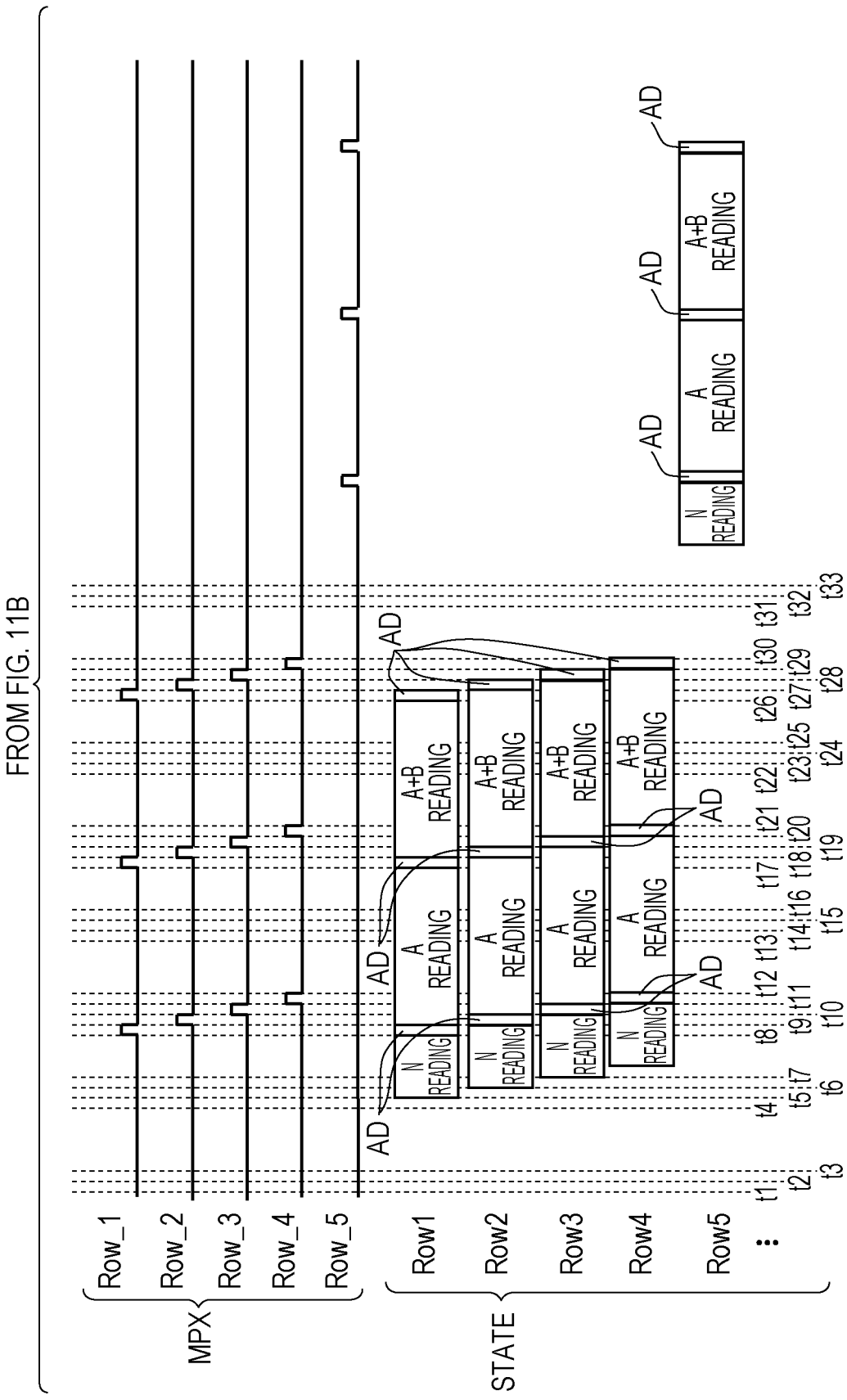

FIGS. 11A to 11C are a chart of operation of the imaging device illustrated in FIG. 9. Operation of FIGS. 11A to 11C is the operation of outputting a focus detection signal and an imaging signal from the imaging device.

Hereinafter, differences from operation illustrated in FIGS. 10A to 10C will be mainly described.

(Operation: Reading of N Signals from Pixels 11 of Each Row)

The same operation as that illustrated in FIGS. 10A to 10C is employed.

(Operation: AD Conversion of N Signals of Pixels 11 of Each Row)

The same operation as that illustrated in FIGS. 10A to 10C is employed.

(Operation: Reading of A Signals corresponding to Pixels 11 of Each Row)

At the time point t9, the vertical scanning circuit brings the signal PTXA output to the pixels 11 of the first row into the High level. Thus, the electric charge accumulated by the photodiode 601a is transferred to the FD portion 605 via the transfer transistor 603a. Consequently, the FD portion 605 has a potential corresponding to the electric charge of the photodiode 601a. The A signal of the pixel 11 of the first row is output to the signal line 201(A) of each column. The A signal is a first signal based on the signals of only some of the multiple photodiodes. The first signal can be used as the focus detection signal.

At the time point t10, the vertical scanning circuit brings the signal PTXA output to the pixels 11 of the second row into the High level. Thus, the A signal of the pixel 11 of the second row is output to the signal line 201(B) of each column.

At the time point t11, the vertical scanning circuit brings the signal PTXA output to the pixels 11 of the third row into the High level. Thus, the A signal of the pixel 11 of the third row is output to the signal line 201(C) of each column.

At the time point t12, the vertical scanning circuit brings the signal PTXA output to the pixels 11 of the fourth row into the High level. Thus, the A signal of the pixel 11 of the fourth row is output to the signal line 201(D) of each column.

(Operation: AD Conversion of A Signals Corresponding to Pixels 11 of Each Row)

At a time point t17, the MPX circuit 350(A) outputs the signal of each signal line 201(A), i.e., the A signal of each pixel 11 of the first row, to the ADC 360(A). The ADC 360(A) converts the A signal of each pixel 11 of the first row into a digital signal.

At a time point t18, the MPX circuit 350(A) outputs the signal of each signal line 201(B), i.e., the A signal of each pixel 11 of the second row, to the ADC 360(A). The ADC 360(A) converts the A signal of each pixel 11 of the second row into a digital signal.

At a time point t19, the MPX circuit 350(A) outputs the signal of each signal line 201(C), i.e., the A signal of each pixel 11 of the third row, to the ADC 360(A). The ADC 360(A) converts the A signal of each pixel 11 of the third row into a digital signal.

At a time point t20, the MPX circuit 350(A) outputs the signal of each signal line 201(D), i.e., the A signal of each pixel 11 of the fourth row, to the ADC 360(A). The ADC 360(A) converts the A signal of each pixel 11 of the fourth row into a digital signal.

(Operation: Reading of A+B Signals of Pixels 11 of Each Row)

At the time point t18, the vertical scanning circuit brings the signals PTXA and PTXB output to the pixels 11 of the first row into the High level. Thus, the electric charges accumulated by the photodiodes 601a and 601b are transferred to the FD portion 605 via the transfer transistors 603a and 603b. Accordingly, the A+B signals of the pixels 11 of the first row are output to the signal lines 201(A).

At the time point t19, the vertical scanning circuit brings the signals PTXA and PTXB output to the pixels 11 of the second row into the High level. Thus, the electric charges accumulated by the photodiodes 601a and 601b are transferred to the FD portion 605 via the transfer transistors 603a and 603b. Accordingly, the A+B signals of the pixels 11 of the second row are output to the signal lines 201(B).

At the time point t20, the vertical scanning circuit brings the signals PTXA and PTXB output to the pixels 11 of the third row into the High level. Thus, the electric charges accumulated by the photodiodes 601a and 601b are transferred to the FD portion 605 via the transfer transistors 603a and 603b. Accordingly, the A+B signals of the pixels 11 of the third row are output to the signal lines 201(C).

At the time point t21, the vertical scanning circuit brings the signals PTXA and PTXB output to the pixels 11 of the fourth row into the High level. Thus, the electric charges accumulated by the photodiodes 601a and 601b are transferred to the FD portion 605 via the transfer transistors 603a and 603b. Accordingly, the A+B signals of the pixels 11 of the fourth row are output to the signal lines 201(D).

(Operation: AD Conversion of A+B Signals of Pixels 11 of Each Row)

At a time point t26, the MPX circuit 350(A) outputs the signal of each signal line 201(A), i.e., the A+B signal of each pixel 11 of the first row, to the ADC 360(A). The ADC 360(A) converts the A+B signal of each pixel 11 of the first row into the digital signal.

At a time point t27, the MPX circuit 350(A) outputs the signal of each signal line 201(B), i.e., the A+B signal of each pixel 11 of the second row, to the ADC 360(A). The ADC 360(A) converts the A+B signal of each pixel 11 of the second row into the digital signal.

At a time point t28, the MPX circuit 350(A) outputs the signal of each signal line 201(C), i.e., the A+B signal of each pixel 11 of the third row, to the ADC 360(A). The ADC 360(A) converts the A+B signal of each pixel 11 of the third row into the digital signal.

At a time point t29, the MPX circuit 350(A) outputs the signal of each signal line 201(D), i.e., the A+B signal of each pixel 11 of the fourth row, to the ADC 360(A). The ADC 360(A) converts the A+B signal of each pixel 11 of the fourth row into the digital signal.

Thereafter, the vertical scanning circuit brings the signal PSEL(5) of each pixel 11 of the fifth row into the High level. Subsequently, similar operation is repeated.

As described above, the imaging device of the present exemplary embodiment can obtain the digital signal based on the N signal of each pixel, the digital signal based on the A signal of each pixel, and the digital signal based on the A+B signal of each pixel.

(Further Advantageous Effects of the Present Exemplary Embodiment: Speed-Up by Parallel Operation by Imaging Device in Operation of FIGS. 11A to 11C)

In operation illustrated in FIGS. 11A to 11C, multiple types of operation are performed in parallel as follows:

(1) parallel operation of reading of the N signals corresponding to the pixels 11 of the first row and reading of the N signals corresponding to the pixels 11 of the second row;

(2) parallel operation of AD conversion of the N signals corresponding to the pixels 11 of the first row and reading of the N signals corresponding to the pixels 11 of the second row;

(3) parallel operation of AD conversion of the N signals corresponding to the pixels 11 of the fourth row and reading of the A signals corresponding to the pixels 11 of the first row;

(4) parallel operation of reading of the A signals corresponding to the pixels 11 of the first row and reading of the A signals corresponding to the pixels 11 of the second row;

(5) parallel operation of AD conversion of the A signals corresponding to the pixels 11 of the first row and reading of the A signals corresponding to the pixels 11 of the second row;

(6) parallel operation of AD conversion of the A signals corresponding to the pixels 11 of the fourth row and reading of the A+B signals corresponding to the pixels 11 of the first row;

(7) parallel operation of reading of the A+B signals corresponding to the pixels 11 of the first row and reading of the A+B signals corresponding to the pixels 11 of the second row; and (8) parallel operation of AD conversion of the A+B signals corresponding to the pixels 11 of the first row and reading of the A signals corresponding to the pixels 11 of the second row.

By such parallel operation, the waiting time until subsequent AD conversion is performed after the ADC 360(A) has completed AD conversion once can be shortened. Thus, the period required for AD conversion of the signals output from all pixels 11 can be shortened. Consequently, enhancement of the frame rate of the imaging device can be progressed.

The present exemplary embodiment is not limited to this example. For example, it may be configured such that in a single frame period, connection to the pixels 11 provided with the color filters of the first color is made and connection to the pixels 11 provided with the color filters of the second color is not made. The pixels 11 of the first column will be focused. The MPX circuit 350(A) connects, to the ADC 360(A), the signal lines 201(A) and 201(C) connected to the pixels 11 provided with the color filters of R as the first color. On the other hand, in such a frame period, the MPX circuit 350(A) does not connect, to the ADC 360(A), the signal lines 201(B) and 201(D) connected to the pixels 11 provided with the color filters of G as the second color. In this configuration, an advantageous effect that correction in AD conversion and correction after AD conversion can be simplified as described in the first exemplary embodiment can be obtained.

Third Exemplary Embodiment

Differences of an imaging device of the present exemplary embodiment from that of the second exemplary embodiment will be mainly described.

In the imaging device of the second exemplary embodiment, all pixels 11 output the focus detection signals and the imaging signals. The imaging device of the present exemplary embodiment outputs focus detection signals corresponding to only some of pixels 11 outputting imaging signals.

Figure 12A:
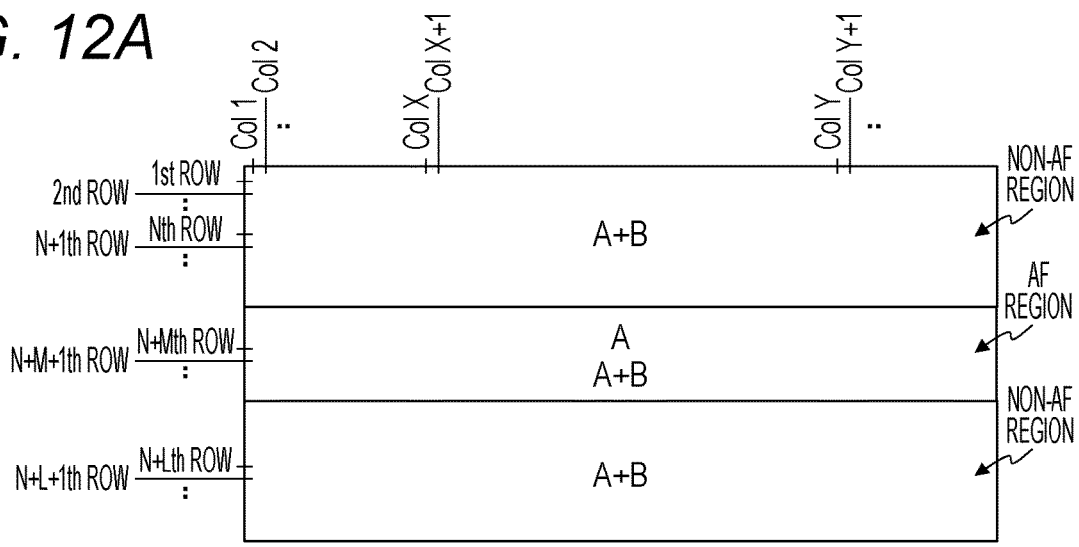
FIGS. 12A to 12C are schematic views of an AF region and a non-AF region of a pixel array.
Figure 12B:
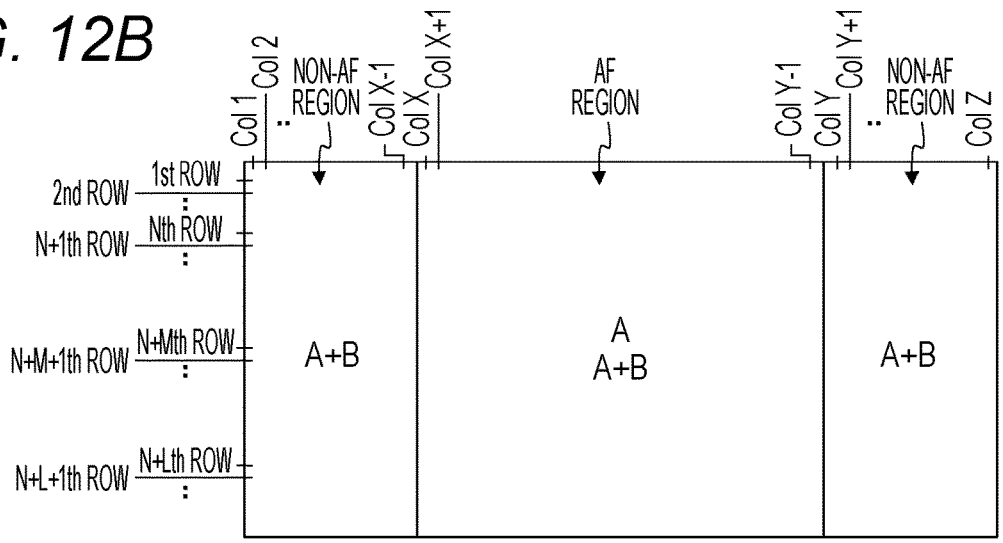
Figure 12C:
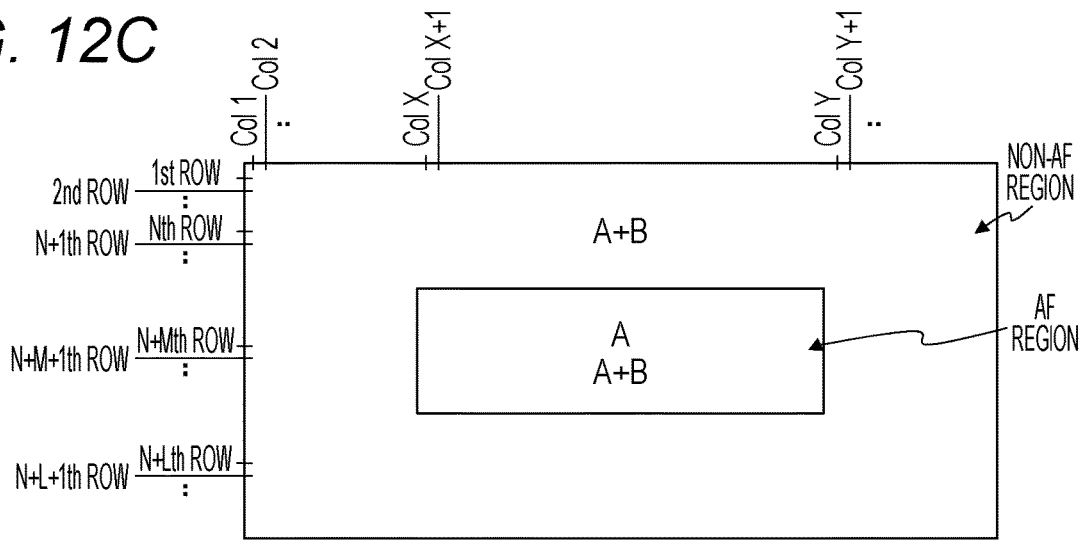

FIGS. 12A to 12C schematically illustrate a pixel array of the multiple pixels 11 arranged in multiple rows and multiple columns. FIGS. 12A to 12C schematically illustrate a signal output from each of the multiple pixels 11. The multiple pixels 11 are pixels included in a first pixel group. The pixel array may include other pixels (a pixel 11 for photoelectric conversion, a light shielded pixel, a reference pixel, etc.) of the first pixel group.

FIG. 12A illustrates an example where an AF region (AF stands for auto focus) for performing focus detection by means of the focus detection signals includes only some rows of the pixel array. Note that a region not belonging to the AF region will be hereinafter expressed as a "non-AF region". In this case, the imaging device outputs A signals corresponding to only the pixels 11 of some rows among the multiple pixels 11 corresponding to A+B signals output from the imaging device.

Signal output of FIG. 12A can be obtained in such a manner that a vertical scanning circuit operates in a focus detection plus imaging mode for the pixel rows of the AF region and operates in an imaging mode for other pixel rows. Other examples include an example where the vertical scanning circuit operates in the focus detection plus imaging mode for all pixel rows. For the pixel rows of the AF region, a MPX circuit 350 outputs, to an ADC 360, each of the A signals and the A+B signals of the pixels 11 included in these pixel rows. On the other hand, for the other pixel rows, the MPX circuit 350 does not output, to the ADC 360, the A signals of the pixels 11 included in the other pixel rows, and outputs, to the ADC 360, the A+B signals of the pixels 11 included in the other pixel rows. In this manner, the output of the imaging device in the form of FIG. 12A can be obtained.

FIG. 12B illustrates an example where the AF region includes only some columns of the pixel array. In this case, the imaging device outputs the A signals corresponding to the pixels 11 of only some columns among the multiple pixels 11 corresponding to the A+B signals output from the imaging device. For all pixel columns, the vertical scanning circuit operates in the focus detection plus imaging mode. Moreover, current sources 310 configured to supply current to signal lines 201 corresponding to the non-AF region reduce a current consumption amount during a period for which the A signals are output to signal lines 201 corresponding to the AF regions. Accordingly, amplification transistors of the pixels 11 of the non-AF region are in an OFF state, and therefore, no A signals are output from the pixels 11 to the signal lines corresponding to the non-AF region.

The A signals and the A+B signals are, as another example, output from the pixels 11 to the signal lines 201 of all columns. For the pixel columns of the AF region, the MPX circuit 350 outputs, to the ADC 360, the A signals and the A+B signals of the pixels 11 included in these pixel columns. On the other hand, for the other pixel columns, the MPX circuit 350 does not output, to the ADC 360, the A signals of the pixels 11 included in the other pixel columns, and outputs, to the ADC 360, the A+B signals of the pixels 11 included in the other pixel columns. In this manner, the output of the imaging device in the form of FIG. 12B can be obtained.

Each ADC 360 AD-converts, as still another example, the A signals and the A+B signals output from the corresponding pixels 11. Of the ADCs 360, the ADC 360 having AD-converted the signals of the pixels 11 corresponding to the AF region outputs digital signals corresponding to the A signals and digital signals corresponding to the A+B signals. Of the ADCs 360, the ADC 360 having AD-converted the signals of the pixels 11 corresponding to the non-AF region does not output the digital signals corresponding to the A signals, and outputs the digital signals corresponding to the A+B signals. In this manner, the output of the imaging device in the form of FIG. 12B can be obtained.

FIG. 12C is an example where the AF region is a rectangular region including only some columns and some rows of the pixel array. This example is available by a combination of the output form of FIG. 12A and the output form of FIG. 12B. That is, the form of FIG. 12A can be applied to the pixel rows illustrated only with "A+B" in FIG. 12C. Moreover, the form of FIG. 12B can be applied to the pixel rows illustrated with both of "A+B" and "A A+B" in FIG. 12C. In this manner, the output form of FIG. 12C can be obtained.

Figure 13B:
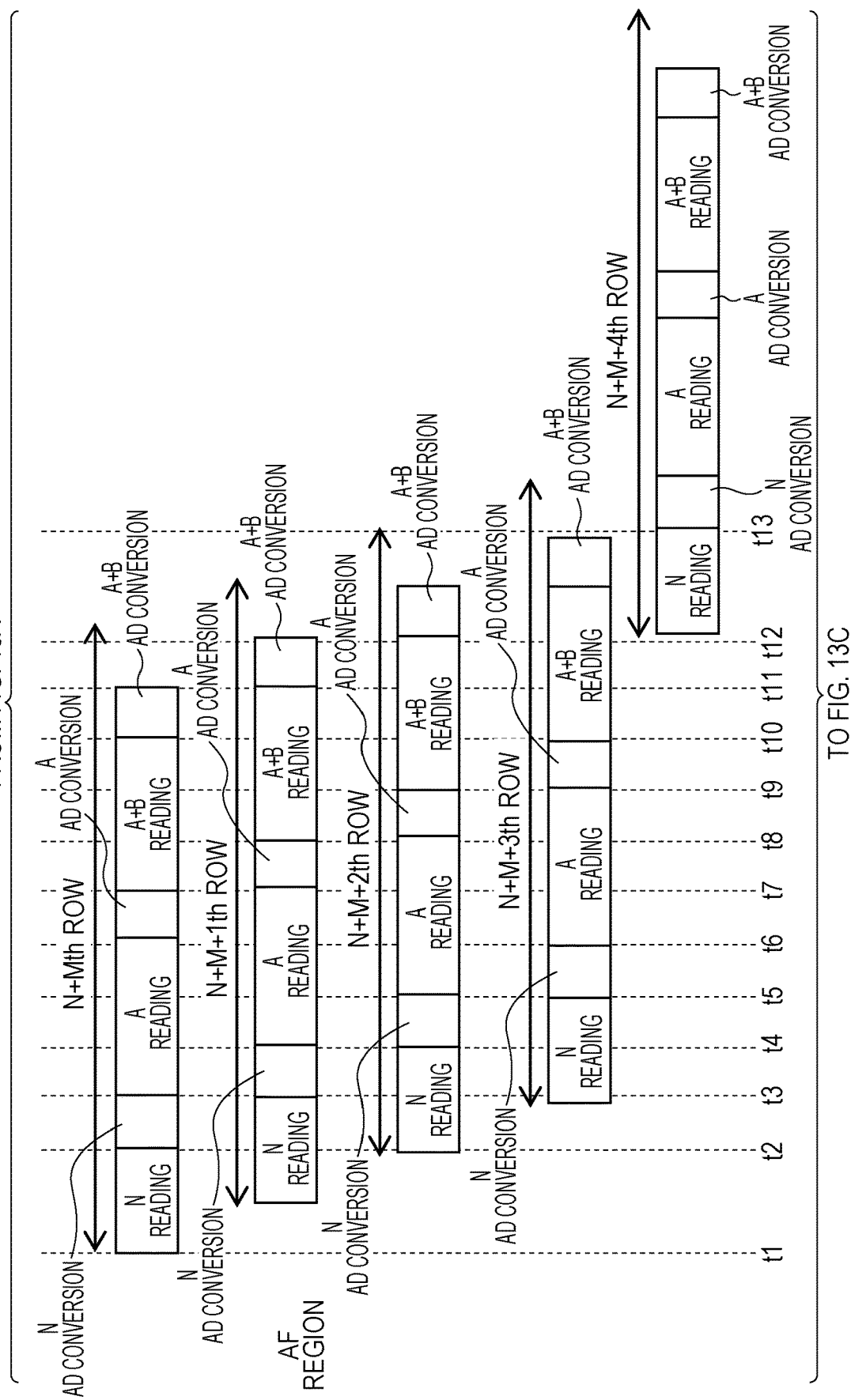
Figure 13C:
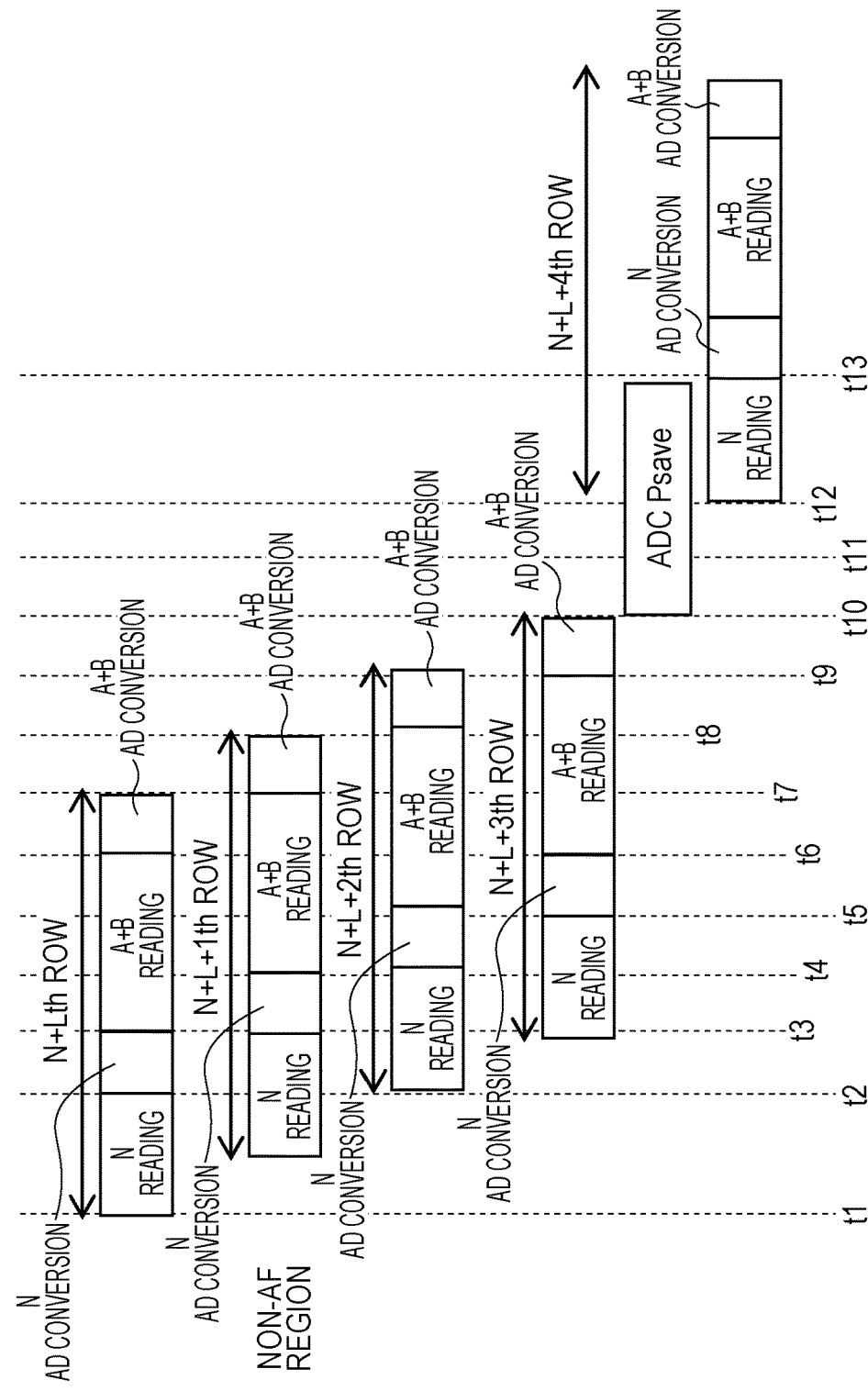

FIGS. 13A to 13C are a chart of operation corresponding to operation of the imaging device illustrated in FIG. 12A. Expressions of A Nth row to a N+L+5th row described in FIGS. 13A to 13C correspond to the rows illustrated in FIG. 12A.

In the progress of speed-up of the imaging device, a waiting period of the ADC 360 is preferably decreased. In an example of FIGS. 13A to 13C, reading of the A+B signals of the N+Mth rows is, for the AF region, performed during a period until AD conversion of the N+M+3th row ends after AD conversion of the A signals of the N+Mth row has completed. Thus, a period until AD conversion of the A+B signals of the N+Mth row begins after AD conversion of the A signals of the N+M+3th row has completed can be shortened. Preferably, the period until AD conversion of the A+B signals of the N+Mth row begins after AD conversion of the A signals of the N+M+3th row has completed can be shortened to a period equal to a period required for switching the signal to be output from the MPX circuit 350 to the ADC 360. In this manner, enhancement of the frame rate of the imaging device and high pixilation of the imaging device can be progressed.

Meanwhile, lower power consumption is also demanded for the imaging device. In the non-AF region, there is the waiting period of the ADC 360 until AD conversion of N signals of the N+4th row begins after AD conversion of the A+B signals of the N+3th row has completed. In this waiting period, the current consumption amount of the ADC 360 is a current amount less than a first current consumption amount as a current consumption amount upon AD conversion. In FIGS. 13A to 13C, a period for reducing the current consumption amount of the ADC 360 is expressed as "ADC Psave". Psave means power save, and indicates that the current consumption amount is reduced. In this manner, the current consumption amount of the imaging device can be lowered.

Figure 14B:
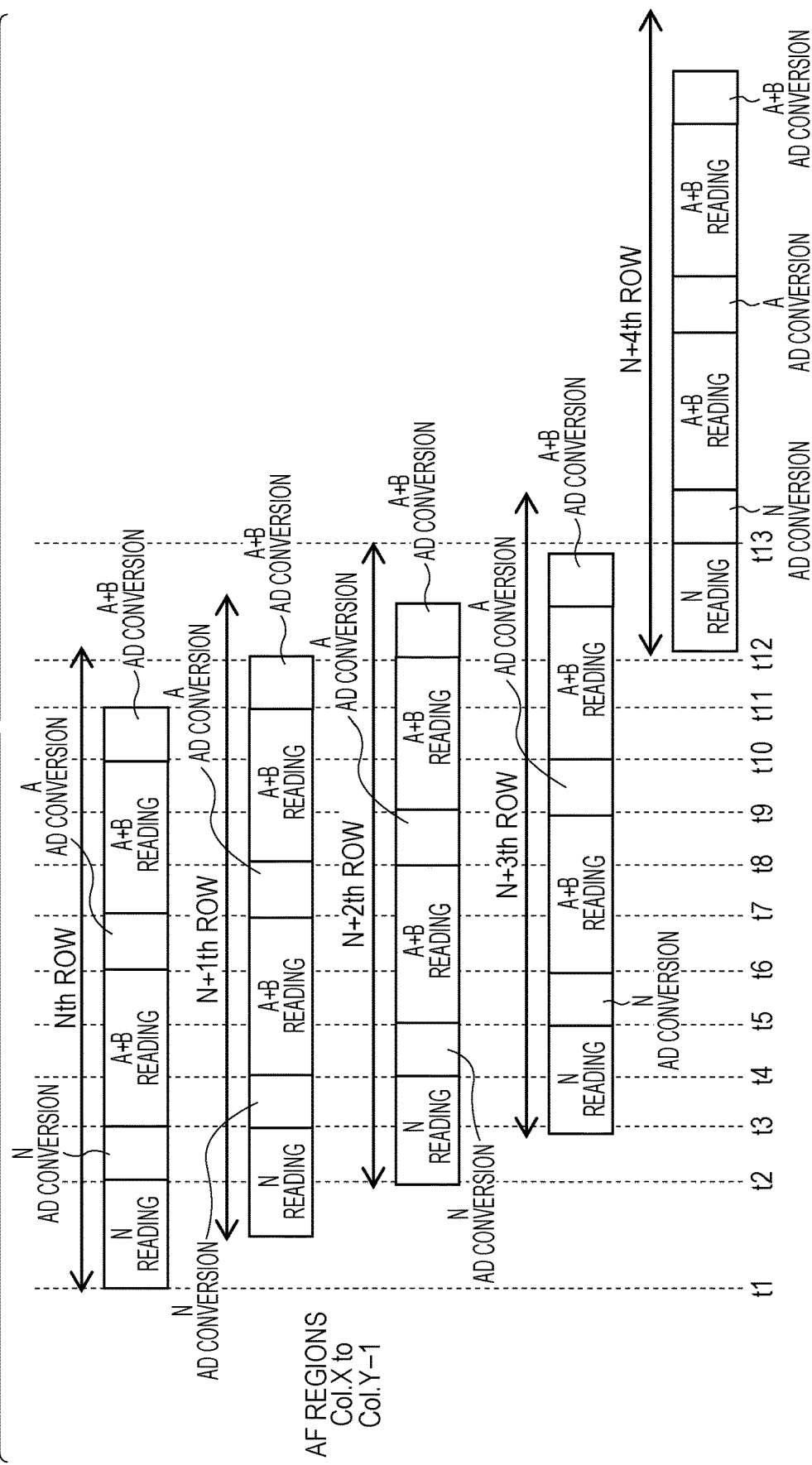

FIGS. 14A and 14B are a chart of operation corresponding to operation of the imaging device illustrated in FIG. 12B. In operation illustrated in FIGS. 14A and 14B, the ADC 360 configured to AD-convert the signals of the pixels 11 corresponding to the AF region performs AD conversion of the A signals and the A+B signals output from the pixels 11. On the other hand, for the non-AF region, no output of the A signals is made from the pixels 11. In operation of FIGS. 14A and 14B, the current consumption amount of the current source 310 configured to supply current to the signal line of the column corresponding to the non-AF region is less than a second current consumption amount as a current consumption amount upon signal reading. Accordingly, even when a signal PSEL supplied to selection transistor 608 of the pixels 11 of the non-AF region is at a High level, amplification transistors 607 are in an OFF state. Thus, the pixels 11 of the non-AF region do not output the A signals to the signal lines 201 during a period for outputting the A signals from the pixels 11 of the AF region to the signal lines 201.

For the ADC 360 configured to AD-convert the signals of the pixels 11 of the non-AF region, after AD conversion of N signals of the N+3th row, a period until AD conversion of the A+B signals of the Nth row begins is the waiting period. The waiting period of the ADC 360 corresponding to the pixels 11 of the non-AF region is a period for performing AD conversion of the A signals by the ADC 360 configured to AD-convert the signals of the pixels 11 corresponding to the AF region. In this waiting period, the current consumption amount of the ADC 360 is a current amount less than the first current consumption amount as the current consumption amount upon AD conversion. In FIGS. 14A and 14B, the period for reducing the current consumption amount of the ADC 360 is also expressed as "ADC Psave".

By operation of FIGS. 14A and 14B, the A signals and the A+B signals of the pixels 11 corresponding to the AF region are AD-converted, and the A+B signals of the pixels 11 corresponding to the non-AF region are AD-converted.

As described above, the digital signals of the A signals and the A+B signals corresponding to the layout of the AF region of FIG. 12B can be output from the imaging device. Moreover, the current consumption amount of each current source 310 of the columns corresponding to the non-AF region is reduced in the A signal reading period for the AF region so that the current consumption amount of the imaging device can be reduced.

In operation of FIGS. 14A and 14B, the operation of not reading the A signals to the signal lines 201 is performed for the pixels 11 of the non-AF region. As described above, the operation of obtaining the output of FIG. 12B of the imaging device may be other examples.

Fourth Exemplary Embodiment

Differences of the present exemplary embodiment from the first exemplary embodiment will be mainly described. An imaging device of the present exemplary embodiment is an example where successive approximation AD converters are used as the ADC 360(A) and the ADC 360(B) of the first exemplary embodiment. Other configurations may be the same as those of the imaging device of the first exemplary embodiment.

Note that in the present exemplary embodiment, application to the ADC of the first exemplary embodiment will be mainly described, but application to the ADC illustrated in the imaging device of the second exemplary embodiment is also available.

(Equivalent Circuit of Successive Approximation ADC)

Figure 15:
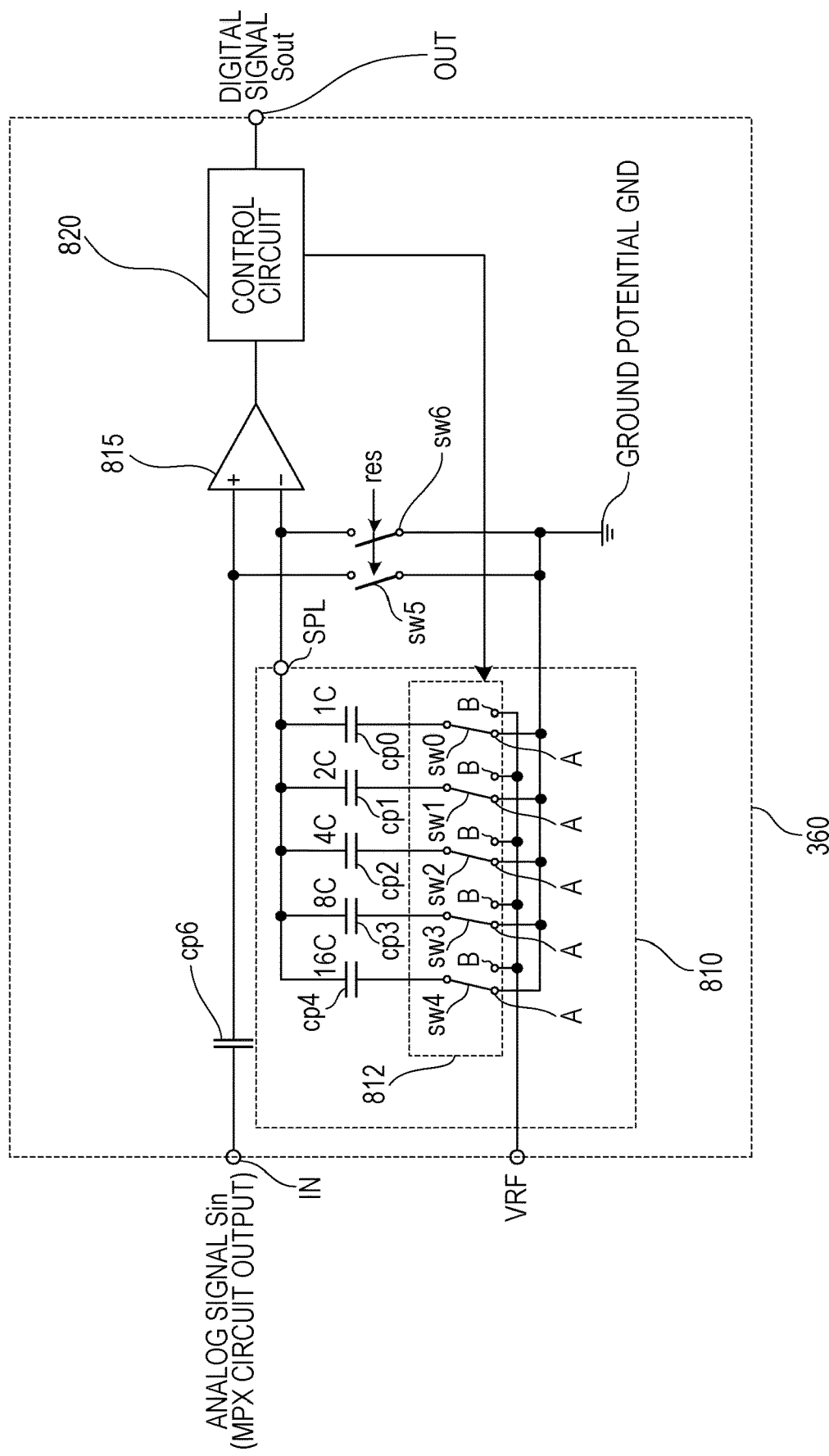
FIG. 15 is a diagram of an equivalent circuit of an AD conversion circuit.

FIG. 15 is an equivalent circuit diagram of the ADC 360 of the present exemplary embodiment.

The ADC 360 has an input terminal IN and an output terminal OUT, and is configured to convert an analog signal Sin (output of a MPX circuit 350) input from the input terminal IN into a digital signal Sout to output the digital signal Sout from the output terminal OUT. The analog signal Sin can be one or both of an N signal and an S signal as described in the first exemplary embodiment. The ADC 360 converts the MPX circuit output into the digital signal Sout with a resolution of 5 bits.

The ADC 360 further has a generation circuit 810 configured to generate a comparison signal used for comparison with the analog signal Sin. The generation circuit 810 has multiple capacitive elements cp0 to cp4 having capacitance values with a binary weight, and multiple switches sw0 to sw4 each connected to the capacitive elements cp0 to cp4. The multiple switches sw0 to sw4 form a switch circuit configured to select one or more of the capacitive elements cp0 to cp4. The binary weight is a group of weights (capacitance values) forming a geometric progression whose common ratio is two. In an example of FIG. 15, the capacitive elements cp0 to cp4 have capacitance values of 1 C, 2 C, 4 C, 8 C, and 16 C, respectively. One electrodes of the capacitive elements cp0 to cp4 are connected to a supply terminal SPL of the generation circuit 810, and the other electrodes are each connected to the switches sw0 to sw4. One end of each of the switches sw0 to sw4 is connected to a corresponding one of the capacitive elements cp0 to cp4, and the other end toggles between a terminal A and a terminal B. A ground potential GND is supplied to the terminal A, and a reference voltage VRF is supplied to the terminal B. The reference voltage VRF is a constant voltage supplied from the outside of the ADC 360, and is a value greater than the ground potential GND. When the switch sw0 toggles to the terminal A, the ground potential GND is supplied to the capacitive element cp0. When the switch sw0 toggles to the terminal B, the reference voltage VRF is supplied to the capacitive element cp0. The same applies to the other switches sw1 to sw4. By switching of the switches sw0 to sw4, the resultant capacitance value of the capacitive elements connected between the supply terminal SPL and the reference voltage VRF changes, and as a result, the value of the comparison signal Vcmp output from the supply terminal SPL changes.

The ADC 360 further has a comparator 815. The comparator 815 is configured to compare the value of the analog signal Sin and the value of the comparison signal Vcmp, thereby outputting a signal corresponding to a comparison result. The analog signal Sin is supplied to a non-inversion input terminal of the comparator 815 via a capacitive element cp6, and the comparison signal Vcmp is supplied from the supply terminal SPL of the generation circuit 810 to an inversion input terminal of the comparator 815. Thus, High is output in a case where the value of the analog signal Sin is equal to or greater than the value of the comparison signal Vcmp, and Low is output in a case where the value of the analog signal Sin is less than the value of the comparison signal Vcmp. In this example, High is output in a case where the value of the analog signal Sin is equal to the value of the comparison signal Vcmp, but Low may be output. The capacitive element cp6 is configured to adjust the value of the analog signal Sin to such a range that comparison with the comparison signal Vcmp is available. In the present exemplary embodiment, a case where the value of the analog signal Sin is equal to or greater than the ground potential GND and equal to or less than the reference voltage VRF and a signal with the same level as that of the analog signal Sin is supplied to the non-inversion input terminal of the comparator 815 is assumed for the sake of simplicity of description.

In the example of FIG. 15, the analog signal Sin is supplied to the non-inversion input terminal of the comparator 815, and the comparison signal Vcmp is supplied to the inversion terminal of the comparator 815. However, other configurations may be employed as long as a magnitude relationship between the value of the analog signal Sin and the value of the comparison signal Vcmp can be determined. For example, a difference between the analog signal Sin and the comparison signal Vcmp may be supplied to the non-inversion input terminal of the comparator 815, and the ground potential GND may be supplied to the inversion terminal of the comparator 815.

The ADC 360 further has switches sw5 and sw6. When these switches sw5 and sw6 are in a conductive state, the ground potential GND is supplied to the non-inversion input terminal and the inversion input terminal of the comparator 815, and the comparator 815 is reset.

The ADC 360 further has a control circuit 820. The comparison result is supplied from the comparator 815 to the control circuit 820. The control circuit 820 generates the digital signal Sout based on the comparison result, and outputs the digital signal Sout from the output terminal OUT. Moreover, the control circuit 820 transmits a control signal to each of the switches sw0 to sw6 to switch the state thereof.

(Operation of Successive Approximation ADC)

Figure 16:
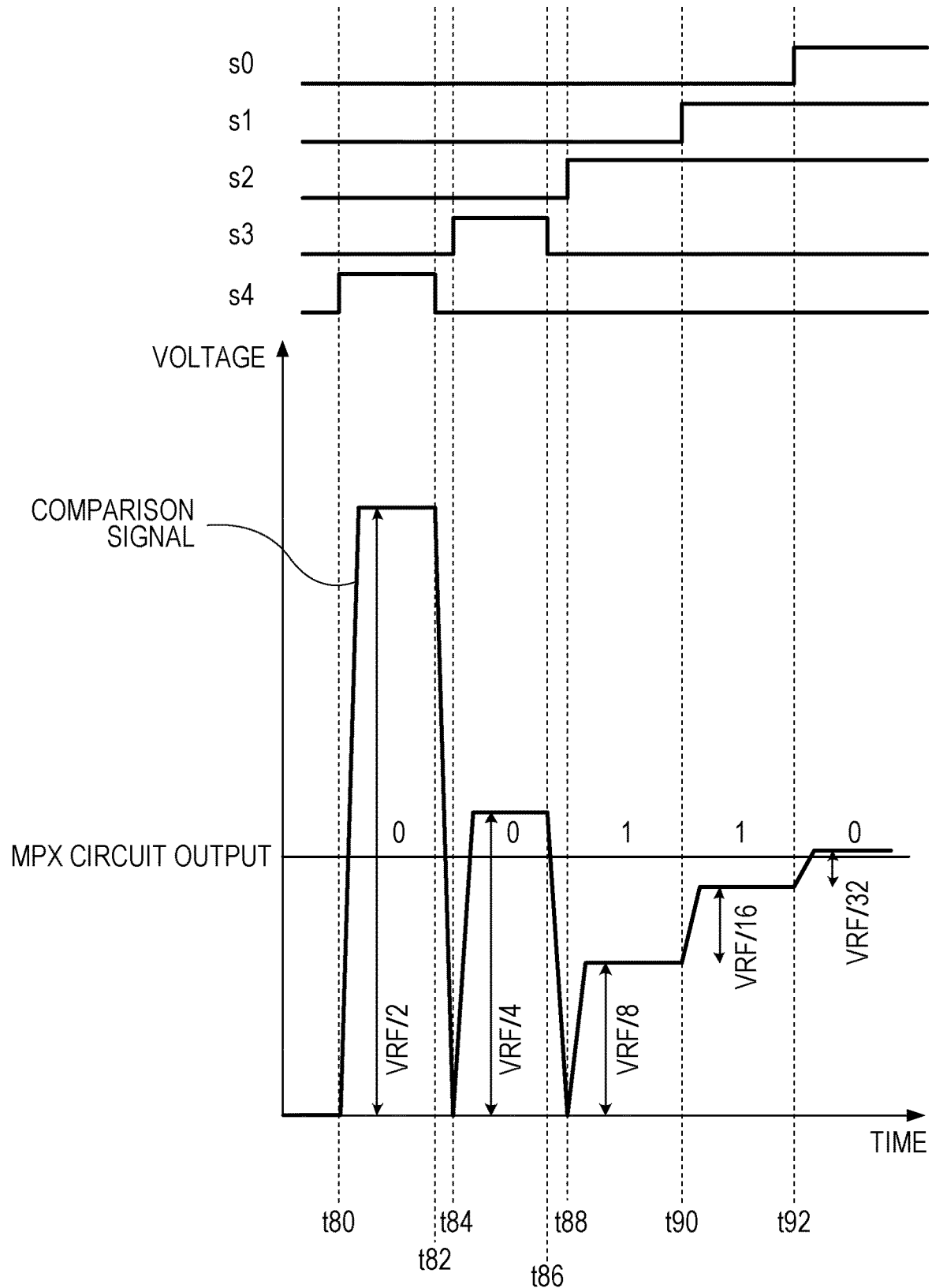
FIG. 16 is a chart of operation of the AD conversion circuit.

In FIG. 16, sw0 to sw6 indicate control signal values supplied from the control circuit 820 to the switches sw0 to sw6. The switches sw0 to sw4 toggle to the terminal B in a case where the supplied control signal is High, and toggle to the terminal A in a case where the control signal is Low. The switches sw5 and sw6 are in the conductive state in a case where the supplied control signal is High, and are in a non-conductive state in a case where the control signal is Low. A lower side of FIG. 16 illustrates the analog signal Sin and the comparison signal Vcmp. In FIG. 16, a case where the value of the analog signal Sin is a binary number corresponding to 00110 is assumed as an example.

Subsequently, AD conversion operation of an AD converter 100 will be described in chronological order. In a preparation period, the control circuit 820 brings the control signals supplied to the switches sw0 to sw4 into Low, and brings the control signals supplied to the switches sw5 and sw6 into High. In this manner, the non-inversion input terminal and the inversion input terminal of the comparator 815 are reset to the ground potential GND, and the value of the comparison signal Vcmp becomes equal to the ground potential GND. Thereafter, the control circuit 820 brings the control signals supplied to the switches sw5 and sw6 into Low. In subsequent operation, the analog signal Sin is continuously supplied to the non-inversion input terminal of the comparator 815.

Next, when a successive approximation period begins, the control circuit 820 changes the control signal supplied to the switch sw4 to High. In this manner, the switch sw4 toggles to the terminal B, and the reference voltage VRF is applied to the supply terminal SPL of the generation circuit 810 via the capacitor cp4 with the first greatest capacitance value of the binary weight. As a result, the comparison signal Vcmp increases by VRF/2, and the value of the comparison signal Vcmp becomes equal to VRF/2. The control circuit 820 determines, based on the comparison result from the comparator 815, that the value of the analog signal Sin is less than the value (VRF/2) of the comparison signal Vcmp, and brings the control signal supplied to the switch sw4 back to Low. Accordingly, the value of the comparison signal Vcmp returns to the ground potential GND. This comparison result means that the MSB (a fifth bit in a case where the LSB is a first bit) of the value of the digital signal Sout is zero.

Next, the control circuit 820 changes the control signal supplied to the switch sw3 to High. In this manner, the reference voltage VRF is applied to the supply terminal SPL of the generation circuit 810 via the capacitor cp3 with the second greatest capacitance value of the binary weight. As a result, the comparison signal Vcmp increases by VRF/4, and the value of the comparison signal Vcmp becomes equal to VRF/4. The control circuit 820 determines, based on the comparison result from the comparator 815, that the value of the analog signal Sin is less than the value (VRF/4) of the comparison signal Vcmp, and brings the control signal supplied to the switch sw3 back to Low. Accordingly, the value of the comparison signal Vcmp returns to the ground potential GND. This comparison result means that the fourth bit of the value of the digital signal Sout is zero.

Next, the control circuit 820 changes the control signal supplied to the switch sw2 to High. In this manner, the reference voltage VRF is applied to the supply terminal SPL of the generation circuit 810 via the capacitor cp2 with the third greatest capacitance value of the binary weight. As a result, the comparison signal Vcmp increases by VRF/8, and the value of the comparison signal Vcmp becomes equal to VRF/8. The control circuit 820 determines, based on the comparison result from the comparator 815, that the value of the analog signal Sin is greater than the value (VRF/8) of the comparison signal Vcmp, and holds the control signal supplied to the switch sw2 at High. Accordingly, the value of the comparison signal Vcmp is maintained at VRF/8. This comparison result means that the third bit of the value of the digital signal Sout is one.

Next, the control circuit 820 changes the control signal supplied to the switch sw1 to High. In this manner, the reference voltage VRF is applied to the supply terminal SPL of the generation circuit 810 via the capacitor cp2 and the capacitor cp1 with the fourth greatest capacitance value of the binary weight. As a result, the comparison signal Vcmp increases by VRF/16, and the value of the comparison signal Vcmp becomes equal to VRF*3/16. Note that "*" used in the present specification means multiplication. The control circuit 820 determines, based on the comparison result from the comparator 815, that the value of the analog signal Sin is greater than the value (VRF*3/16) of the comparison signal Vcmp, and holds the control signal supplied to the switch sw1 at High. Accordingly, the value of the comparison signal Vcmp is maintained at VRF*3/16. This comparison result means that the second bit of the value of the digital signal Sout is one.

Eventually, the control circuit 820 changes the control signal supplied to the switch sw0 to High. In this manner, the reference voltage VRF is applied to the supply terminal SPL of the generation circuit 810 via cp1, cp2, and the capacitor cp0 with the fifth greatest capacitance value of the binary weight. As a result, the comparison signal Vcmp increases by VRF/32, and the value of the comparison signal Vcmp becomes equal to VRF*7/32. The control circuit 820 determines, based on the comparison result from the comparator 815, that the value of the analog signal Sin is less than the value (VRF*7/32) of the comparison signal Vcmp, and returns the control signal supplied to the switch sw0 to Low. Accordingly, the value of the comparison signal Vcmp returns to VRF*3/16. This comparison result means that the first bit of the value of the digital signal Sout is zero.

By successive approximation described above, the control circuit 820 determines that the digital signal Sout corresponding to the analog signal is 00110.

As described above, the ADC 360 can perform AD conversion for generating the digital signal corresponding to the input analog signal.

(Other AD Conversion Forms)

In the second exemplary embodiment, the example where the successive approximation AD converter is used as the ADC 360 has been described. The ADC 360 is not limited to the successive approximation AD converter. For example, various AD converters such as a ramp signal comparison AD converter, a delta-sigma AD converter, a pipeline AD converter, and a flash AD converter can be used as other AD converters.

(AD Conversion Bit Numbers of A Signal and A+B Signal)

In the imaging devices of the first to third exemplary embodiments, each pixel 11 outputs the A signal and the A+B signal. Tendency shows that the A signal has a smaller signal amplitude than that of the A+B signal. Thus, the AD conversion bit number of the A signal can be less than that of the A+B signal. Typically, the amplitude of the A signal is equal to or less than ½ of the signal amplitude of the A+B signal. Thus, the AD conversion bit number of the A signal can be less than that of the A+B signal by one bit. Specifically, in the case of the successive approximation AD converter described in the present exemplary embodiment, input of the comparison signal used for fixing the most significant bit in AD conversion of the A+B signal is omitted in AD conversion of the A signal. AD conversion of the A signal may begin from input of a comparison signal with ½ of the amplitude of the comparison signal used for fixing the most significant bit in AD conversion of the A+B signal. Thus, an AD conversion period of the A signal can be shortened as compared to an AD conversion period of the A+B signal.

A smaller AD conversion bit number of the A signal than the AD conversion bit number of the A+B signal is not limited to the successive approximation AD converter. For example, in the case of the ramp comparison AD converter using a ramp signal, a period for changing the potential of the ramp signal may be shorter in AD conversion of the A signal than in AD conversion of the A+B signal. Thus, the AD conversion period of the A signal can be shortened as compared to the AD conversion period of the A+B signal.

Moreover, the bit number of the digital signal of the A signal is less than that of the A+B signal, and therefore, a period for reading the digital signal of the A signal from the ADC 360 can be shortened. Thus, a period for reading the digital signals of the A signals from the multiple ADCs 360 can be shortened.

In the imaging devices of the first to third exemplary embodiments, the A signal of each pixel 11 of the second row is AD-converted before the A+B signal of each pixel 11 of the first row is AD-converted and after the A signal of each pixel 11 of the first row has been AD-converted. In the case of this configuration, the configuration in which the bit number of the digital signal of the A signal is less than that of the A+B signal can provide a more prominent effect. That is, in AD conversion of the A+B signal of each pixel 11 of the first row after the A signal of each pixel 11 of the first row has been AD-converted, the control of changing the bit number needs to be performed in the ADC 360. In this case, a waiting time for the control of switching the bit number is caused, or a change in a correction parameter due to a change in operation of the ADC 360 is caused. A change in the correction parameter includes, for example, correction of the reference voltage VRF in the case of the successive approximation comparator. Regarding such processing in association with a change in the bit number, AD conversion of the signals of the pixels 11 of two rows will be focused. In this case, the total of three controls of changing the bit number is necessary between AD conversion of the A signals of the first row and AD conversion of the A+B signals of the first row, between AD conversion of the A+B signals of the first row and AD conversion of the A signals of the second row, and between AD conversion of the A signals of the second row and the AD conversion of the A+B signals of the second row. When the number of pixel rows targeted for AD conversion is N rows, the processing of changing the bit number needs to be performed 2N−1 times. If N=8, the bit number needs to be changed 15 times. On the other hand, in the first to third exemplary embodiments, the A signal of each pixel 11 of the second row is AD-converted before the A+B signal of each pixel 11 of the first row is AD-converted and after the A signal of each pixel 11 of the first row has been AD-converted. In such operation, when the number of signal lines 201 connected to the single ADC 360 is M, the processing of changing the bit number is performed (N/M)−1+(N/M)=(2N/M)−1 (times). For example, in the forms of the first to third exemplary embodiments, the bit number is changed three times because of N=8 and M=4. That is, after the A signals of the pixels 11 of the first to fourth rows have been sequentially AD-converted, the bit number is increased (a first bit number change), and the A+B signals of the first to fourth rows are sequentially AD-converted. Then, the bit number is decreased (a second bit number change), and the A signals of the pixels 11 of the fifth to eighth rows are sequentially AD-converted. Then, the bit number is increased (a third bit number change), and the A+B signals of the fifth to eighth rows are sequentially AD-converted. Thus, in the case of sequentially AD-converting the A signals and the A+B signals of the pixels 11 of the first row, the bit number needs to be changed 15 times. On the other hand, in the forms of the first to third exemplary embodiments, the bit number is changed only three times. As described above, it can be said that the reading method in the first to third exemplary embodiments is the reading method suitable for a change in the bit numbers of the A signal and the A+B signal.

Fifth Exemplary Embodiment

Figure 17:
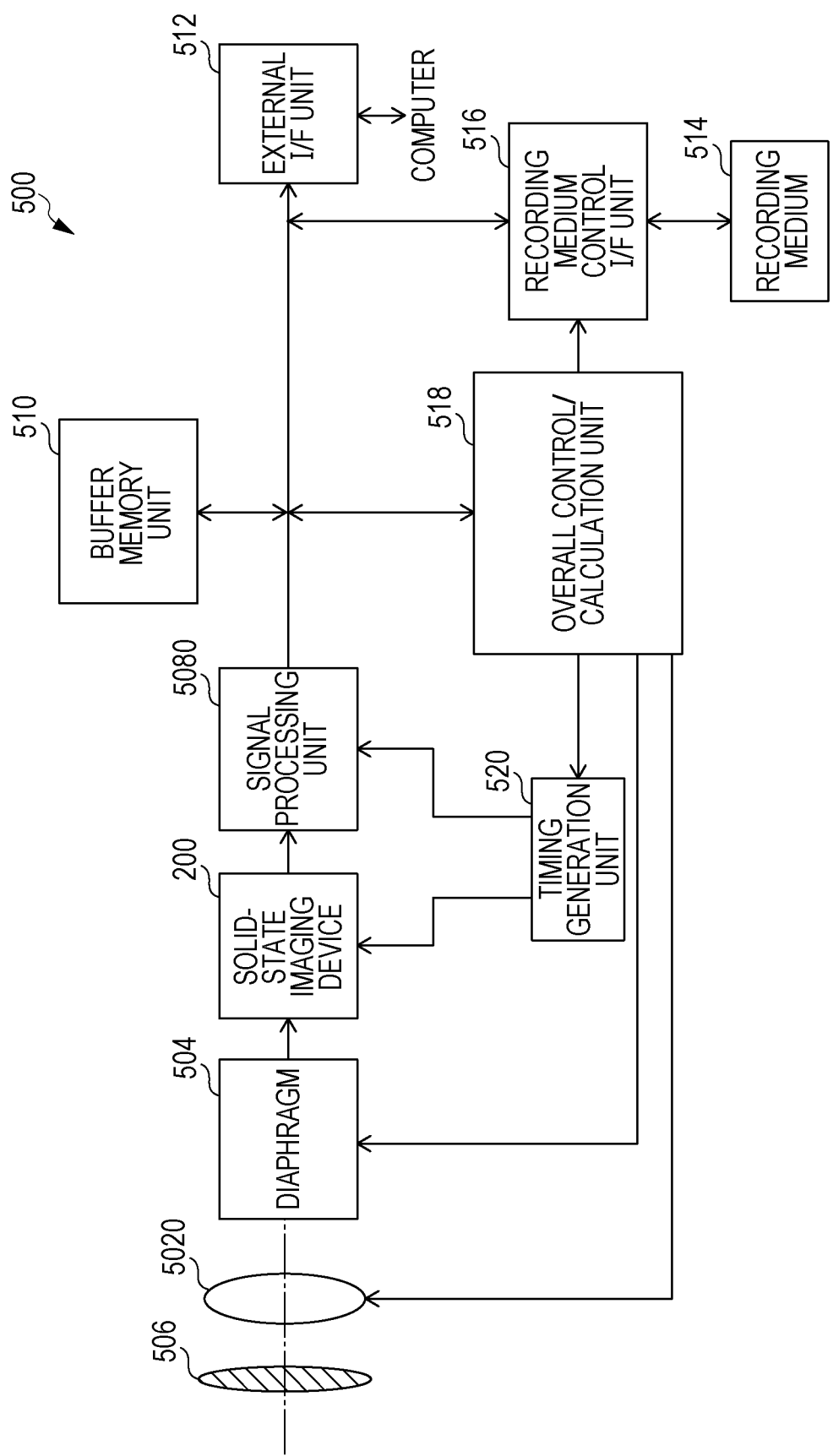
FIG. 17 is a diagram of a configuration of an imaging system.

FIG. 17 is a block diagram of a configuration of an imaging system 500 according to the present exemplary embodiment. The imaging system 500 of the present exemplary embodiment includes an imaging device 200 to which any of the configurations of the imaging devices described above in the exemplary embodiments is applied. Specific examples of the imaging system 500 include a digital still camera, a digital camcorder, and a monitoring camera. FIG. 17 illustrates the configuration example of the digital still camera to which any of the imaging devices described above in the exemplary embodiments is applied as the imaging device 200.

The imaging system 500 illustrated as an example in FIG. 17 has the imaging device 200, a lens 5020 configured to form an optical image of an object on the imaging device 200, a diaphragm 504 configured to vary the amount of light passing through the lens 5020, and a barrier 506 for protection of the lens 5020. The lens 5020 and the diaphragm 504 are an optical system configured to collect light to the imaging device 200.

The imaging system 500 further has a signal processing unit 5080 configured to perform processing for an output signal from the imaging device 200. The signal processing unit 5080 performs, for an input signal, various types of signal processing operation of outputting a signal after correction/compression, as necessary. The signal processing unit 5080 may have the function of performing AD conversion processing for the output signal from the imaging device 200. In this case, an AD conversion circuit is not necessarily provided in the imaging device 200.

The imaging system 500 further has a buffer memory unit 510 configured to temporarily store image data, and an external interface unit (an external I/F unit) 512 configured to communicate with an external computer etc. Further, the imaging system 500 has a recording medium 514 such as a semiconductor memory for recording or reading of imaging data, and a recording medium control interface unit (a recording medium control I/F unit) 516 configured to perform recording or reading for the recording medium 514. Note that the recording medium 514 may be built in the imaging system 500, or may be detachably mounted.

Further, the imaging system 500 has an overall control/calculation unit 518 configured to perform various types of calculation and control the entirety of the digital still camera, and a timing generation unit 520 configured to output various timing signals to the imaging device 200 and the signal processing unit 5080. The timing signals etc. as described herein may be input from the outside, and the imaging system 500 may have at least the imaging device 200 and the signal processing unit 5080 configured to process the output signal from the imaging device 200. The overall control/calculation unit 518 and the timing generation unit 520 may be configured to implement some or all of control functions of the imaging device 200.

The imaging device 200 outputs an image signal to the signal processing unit 5080. The signal processing unit 5080 performs predetermined signal processing for the image signal output from the imaging device 200, thereby outputting the image data. Moreover, the signal processing unit 5080 uses the image signal to generate an image.

The imaging system is formed using the imaging device of each of the above-described embodiments, and therefore, the imaging system configured so that an image with better quality can be obtained can be realized.

Sixth Exemplary Embodiment

An imaging system and a moving body of the present exemplary embodiment will be described with reference to FIGS. 18A, 18B, and 19.

Figure 18A:
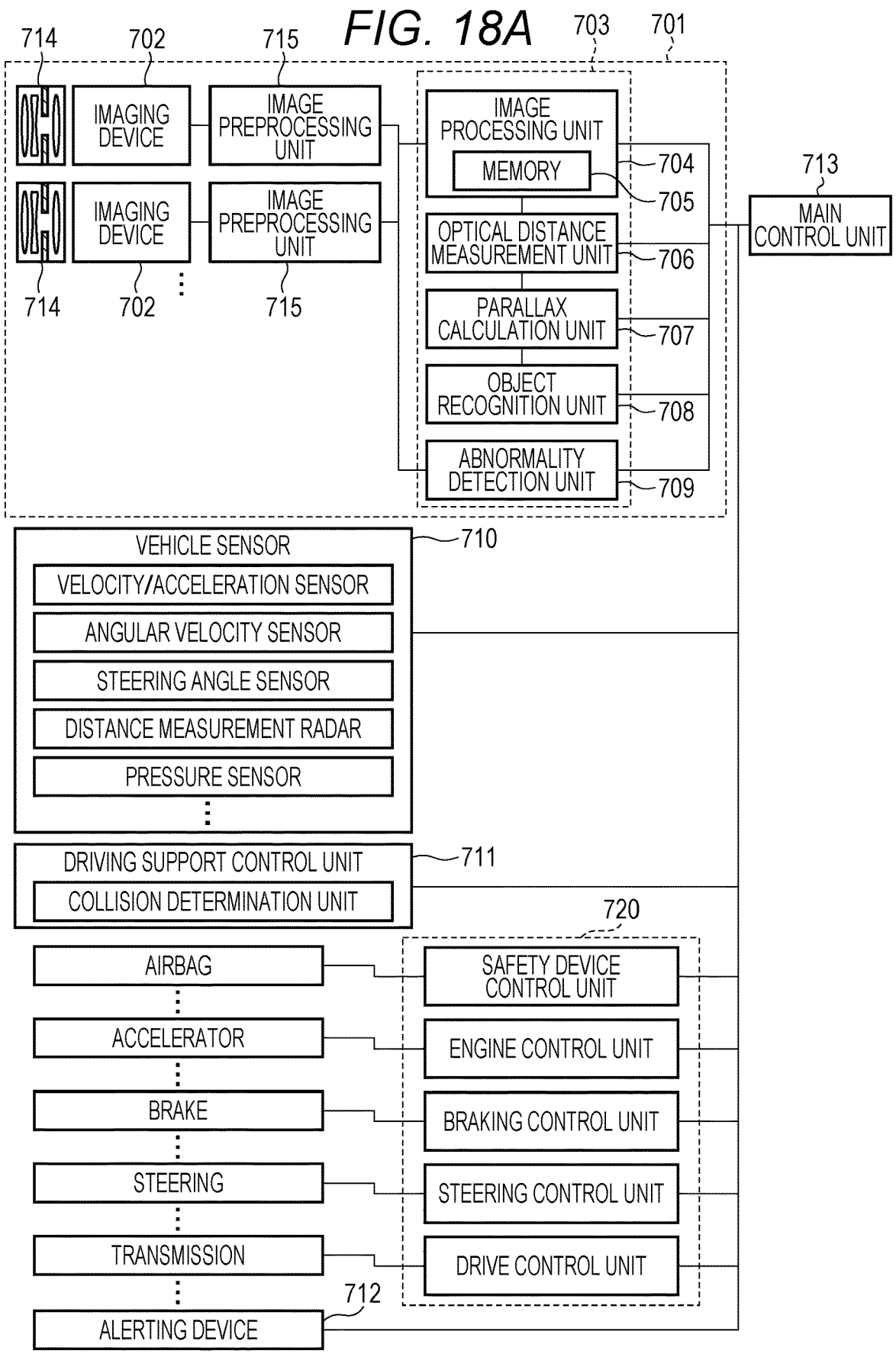
Figure 19:
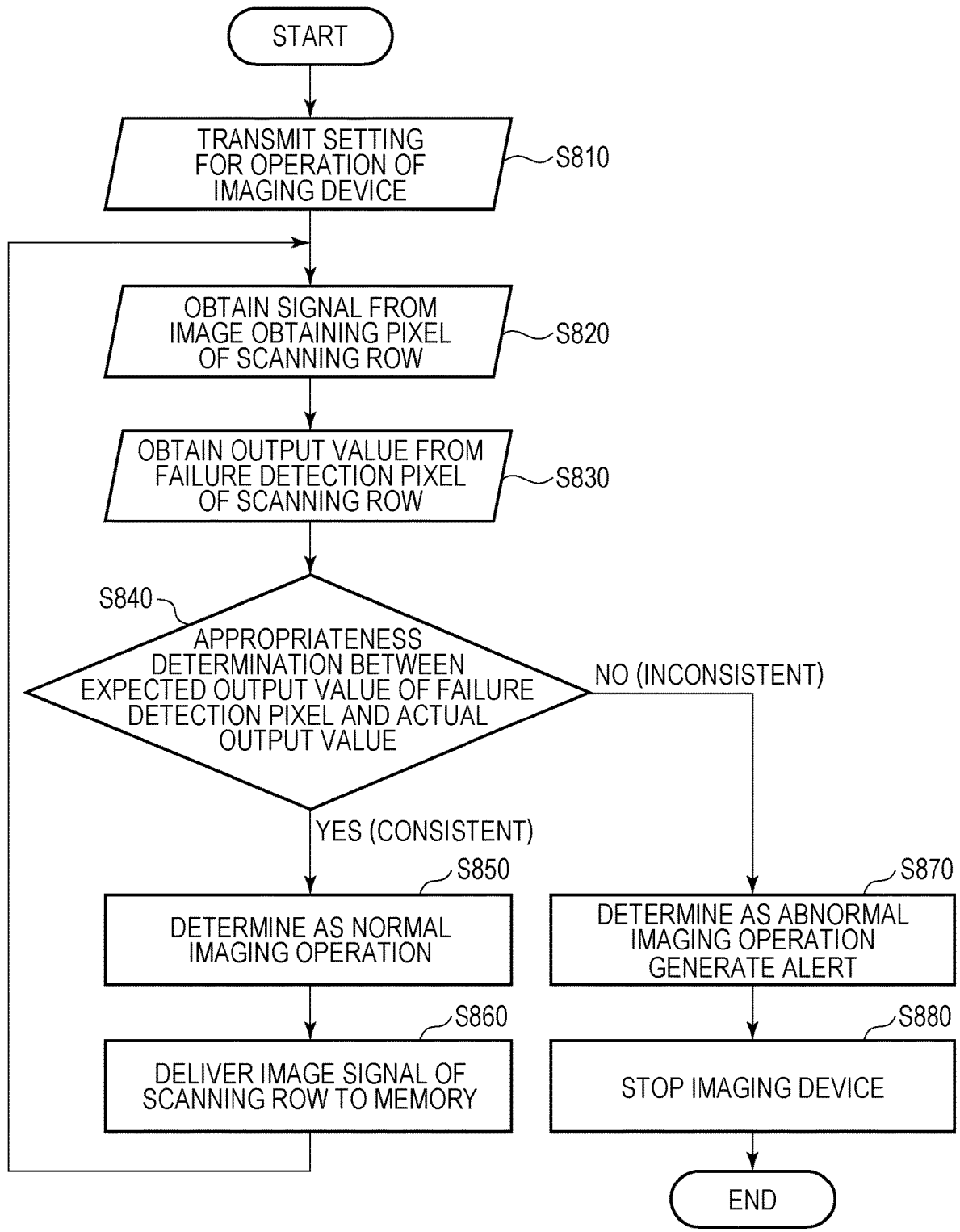
FIG. 19 is a chart of operation of the imaging system.

FIGS. 18A and 18B are schematic diagram and view of a configuration example of the imaging system and the moving body of the present exemplary embodiment. FIG. 19 is a flowchart of operation of the imaging system of the present exemplary embodiment.

The present exemplary embodiment illustrates one example of the imaging system regarding an on-vehicle camera. FIGS. 18A and 18B illustrate one example of a vehicle system and the imaging system mounted thereon. An imaging system 701 includes imaging devices 702, image preprocessing units 715, an integrated circuit 703, and optical systems 714. The optical system 714 is configured to form an optical image of an object on the imaging device 702. The imaging device 702 is configured to convert the optical image of the object formed by the optical system 714 into an electric signal. The imaging device 702 is any of the imaging devices of the above-described exemplary embodiments. The image preprocessing unit 715 is configured to perform predetermined signal processing for a signal output from the imaging device 702. The function of the image preprocessing unit 715 may be incorporated into the imaging device 702. In the imaging system 701, at least two groups of the optical systems 714, the imaging devices 702, and the image preprocessing units 715 are provided, and output from the image preprocessing unit 715 of each group is input to the integrated circuit 703.

The integrated circuit 703 is an integrated circuit for use in an imaging system, and includes an image processing unit 704 having a memory 705, an optical distance measurement unit 706, a parallax calculation unit 707, an object recognition unit 708, and an abnormality detection unit 709. The image processing unit 704 is configured to perform, for an output signal of each image preprocessing unit 715, image processing such as image processing or defect correction. The memory 705 is configured to temporarily store a captured image and store a defect position of the captured image. The optical distance measurement unit 706 is configured to perform focusing or distance measurement for the object. The parallax calculation unit 707 is configured to calculate a parallax (a parallax image phase difference) from multiple pieces of image data obtained by the multiple imaging devices 702. The object recognition unit 708 is configured to recognize the object such as a car, a road, a sign, and a person. The abnormality detection unit 709 is configured to report an abnormality of the imaging device 702 to a main control unit 713 when the abnormality is detected.

The integrated circuit 703 may be implemented by exclusively-designed hardware, by a software module, or by a combination thereof. Alternatively, the integrated circuit 703 may be implemented by, e.g., a field programmable gate array (FPGA), an application specific integrated circuit (ASIC), or a combination thereof.

The main control unit 713 is configured to perform overall control for operation of the imaging system 701, a vehicle sensor 710, a control unit 720, etc. Note that a method may be employed, in which the main control unit 713 is not provided and the imaging system 701, the vehicle sensor 710, and the control unit 720 separately have communication interfaces and are each configured to perform transmission/reception of a control signal via a communication network (e.g., CAN standards).

The integrated circuit 703 has the function of transmitting the control signal or a set value to the imaging device 702 in response to the control signal from the main control unit 713 or by a control unit of the integrated circuit 703 itself. For example, the integrated circuit 703 transmits, for example, a setting for pulse-driving a voltage switch 13 in the imaging device 702 or a setting for switching the voltage switch 13 for each frame.

The imaging system 701 is connected to the vehicle sensor 710, and can detect a subject vehicle traveling state such as a vehicle velocity, a yaw rate, and a steering angle, environment outside a subject vehicle, or states of other vehicles/obstacles. The vehicle sensor 710 also serves as a distance information obtaining unit configured to obtain information on a distance from the parallax image to a target object. Moreover, the imaging system 701 is connected to a driving support control unit 711 configured to perform various types of driving support such as an automatic steering function, an automatic cruising function, and a collision prevention function. Specifically, a collision determination function is for estimating, based on a detection result of the imaging system 701 or the vehicle sensor 710, collision with other vehicles/obstacles or determining the presence or absence of collision. Thus, avoidance control in a case where collision is estimated and start-up of a safety device upon collision are performed.

Moreover, the imaging system 701 is also connected to an alerting device 712 configured to generate an alert to a driver based on a determination result of a collision determination unit. For example, in a case where a collision probability is high as the determination result of the collision determination unit, the main control unit 713 performs, for example, the vehicle control of applying a brake, releasing an accelerator, or reducing engine output to avoid collision and reduce damage. The alerting device 712 is configured to alert a user by, e.g., generation of an alert such as sound, displaying of alerting information on a display unit screen such as a car navigation system or a meter panel, or application of vibration to a seat belt or a steering.

In the present exemplary embodiment, the imaging system 701 captures an image of the periphery of a vehicle, such as a front side or a back side of the vehicle. FIG. 18B illustrates a layout example of the imaging system 701 in the case of capturing the image of the front side of the vehicle by the imaging system 701.

Two imaging devices 702 are arranged on a front side of a vehicle 700. Specifically, when two imaging devices 702 are arranged symmetrically with respect to a symmetrical axis as an advancing/retreating direction of the vehicle 700 or a center axis of an outer shape (e.g., a vehicle width) of the vehicle 700, such layout is preferable in obtaining of information on a distance between the vehicle 700 and a photographic target or in determination of the collision probability. Moreover, the imaging devices 702 are preferably in such layout that the field of view of the driver is not blocked when the driver visually recognizes a situation outside the vehicle 700 from a driver's seat. The alerting device 712 is preferably in such layout that the alerting device 712 easily comes into the field of view of the driver.

Next, failure detection operation of the imaging device 702 in the imaging system 701 will be described with reference to FIG. 19. The failure detection operation of the imaging device 702 is performed according to steps S810 to S880 illustrated in FIG. 19.

Step S810 is a step of performing setting upon start-up of the imaging device 702. That is, a setting for operation of the imaging device 702 is transmitted from the outside (e.g., the main control unit 713) of the imaging system 701 or the inside of the imaging system 701, and imaging operation and the failure detection operation of the imaging device 702 begin.

Subsequently, at step S820, a pixel signal is obtained from an effective pixel. Moreover, at step S830, an output value from a failure detection pixel provided for failure detection is obtained. The failure detection pixel includes a photoelectric conversion unit as in the effective pixel. A predetermined voltage is written in the photoelectric conversion unit. The failure detection pixel outputs a signal corresponding to the voltage written in the photoelectric conversion unit. Note that step S820 and step S830 may be inversed.

Subsequently, at step S840, appropriateness determination between an expected output value of the failure detection pixel and an actual output value from the failure detection pixel is performed.

As a result of appropriateness determination at step S840, in a case where the expected output value and the actual output value are coincident with each other, the processing transitions to step S850, and it is determined that the imaging operation is normally performed. Then, the processing step transitions to step S860. At step S860, pixel signals of a scanning row are transmitted to the memory 705, and are temporarily saved. Thereafter, the processing returns to step S820, and the failure detection operation is continued.

On the other hand, as a result of appropriateness determination at step S840, in a case where the expected output value and the actual output value are not coincident with each other, the processing step transitions to step S870. At step S870, it is determined that there is an abnormality in the imaging operation, and an alert is generated for the main control unit 713 or the alerting device 712. The alerting device 712 displays, on a display unit, an indication of the detected abnormality. Thereafter, at step S880, the imaging device 702 is stopped, and operation of the imaging system 701 ends.

Note that in the present exemplary embodiment, the example where the flowchart is performed in a loop manner for each row has been described. However, the flowchart may be performed in a loop manner for every multiple rows, or the failure detection operation may be performed per frame.

Note that notification of generation of the alert at step S870 may be provided to the outside of the vehicle via a wireless network.

In the present exemplary embodiment, the control of avoiding collision with other vehicles has been described. However, the disclosure is also applicable to, e.g., the control of performing automatic driving to follow other vehicles and the control of performing automatic driving to avoid traveling out of a traffic lane. Further, the imaging system 701 is not limited to the vehicle such as the subject vehicle, and is also applicable to a moving body (a moving device) such as a ship, an airplane, or an industrial robot. In addition, the imaging system 701 is, not limited to the moving body, applicable to equipment utilized for broadly recognizing an object, such as an intelligent transport system (ITS).

[Variations]

The disclosure is not limited to the above-described exemplary embodiments, and variations can be made.

For example, an example where some configurations of any of the exemplary embodiments are added to other exemplary embodiments or an example where some configurations of any of the exemplary embodiments are replaced with some configurations of the other exemplary embodiments are also included in the exemplary embodiments.

Moreover, any of the above-described exemplary embodiments is merely a specific example in implementation of the disclosure, and the technical scope of the disclosure shall not be interpreted in a limited manner due to these examples. That is, the present disclosure can be implemented in various forms without departing from the technical idea or the main features of the disclosure.

According to the disclosure, in the configuration in which the first and second signals output from each of the pixels arranged in the multiple rows are AD-converted, the order of the signals to be AD-converted can be properly provided.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-192055, filed Sep. 29, 2017, which is hereby incorporated by reference herein in its entirety.

What is claimed is:

1. An imaging device comprising:
multiple pixels having multiple photoelectric conversion units;
an AD conversion unit; and
a control unit,
wherein each of the multiple pixels outputs a first signal based on signals of only some of the multiple photoelectric conversion units and a second signal based on signals of the multiple photoelectric conversion units,
a photoelectric conversion period of the photoelectric conversion units corresponding to the first signal and a photoelectric conversion period of the photoelectric conversion units corresponding to the second signal at least partially overlap with each other,
the multiple pixels include a first pixel and a second pixel,
the control unit
causes the AD conversion unit to perform AD conversion for converting the first signal output from the first pixel into a digital signal during a first period,
causes the AD conversion unit to perform AD conversion for converting the first signal output from the second pixel into a digital signal before AD conversion for converting the second signal output from the first pixel into a digital signal during a second period after the first period,
causes the AD conversion unit to perform the AD conversion for converting the second signal output from the first pixel into the digital signal during a third period after the second period, and
causes the AD conversion unit to perform AD conversion for converting the second signal output from the second pixel into a digital signal during a fourth period after the third period.

2. The imaging device according to claim 1, further comprising:
a first signal line connected to the first pixel;
a second signal line connected to the second pixel; and
a selection unit configured to select one of the first signal line or the second signal line to connect the selected one of the first signal line or the second signal line to the AD conversion unit,
wherein during the second period, the selection unit connects, to the AD conversion unit, the first signal line to which the first signal of the second pixel is output, and
during the second period, the first pixel outputs the second signal to the first signal line.

3. The imaging device according to claim 2, wherein
during the first period, the selection unit connects, to the AD conversion unit, the first signal line to which the first signal of the first pixel is output, and
during the first period, the second pixel outputs the second signal to the second signal line.

4. The imaging device according to claim 2, wherein
during the third period, the selection unit connects, to the AD conversion unit, the first signal line to which the second signal of the first pixel is output, and
during the third period, the second pixel outputs the second signal to the second signal line.

5. The imaging device according to claim 2, further comprising:
a pixel array including the multiple pixels and other pixels,
wherein a first pixel group included in the pixel array and having multiple pixels outputs the second signal, and
only some of the pixels of the first pixel group output the first signal.

6. The imaging device according to claim 3, further comprising:
a pixel array including the multiple pixels and other pixels,
wherein a first pixel group included in the pixel array and having multiple pixels outputs the second signal, and
only some of the pixels of the first pixel group output the first signal.

7. The imaging device according to claim 4, further comprising:
a pixel array including the multiple pixels and other pixels,
wherein a first pixel group included in the pixel array and having multiple pixels outputs the second signal, and
only some of the pixels of the first pixel group output the first signal.

8. The imaging device according to claim 5, wherein
the AD conversion unit includes multiple AD conversion units,
the multiple AD conversion units include a first AD conversion unit configured to AD-convert the first signal output from the only some of the pixels, and a second AD conversion unit configured to AD-convert the second signal output from some other pixels of the first pixel group,
the second AD conversion unit consumes current of a first current consumption amount upon AD conversion of the second signal, and
a current consumption amount of the second AD conversion unit is less than the first current consumption amount during a period for AD-converting the first signal by the first AD conversion unit.

9. The imaging device according to claim 6, wherein
the AD conversion unit includes multiple AD conversion units,
the multiple AD conversion units include a first AD conversion unit configured to AD-convert the first signal output from the only some of the pixels, and a second AD conversion unit configured to AD-convert the second signal output from some other pixels of the first pixel group,
the second AD conversion unit consumes current of a first current consumption amount upon AD conversion of the second signal, and
a current consumption amount of the second AD conversion unit is less than the first current consumption amount during a period for AD-converting the first signal by the first AD conversion unit.

10. The imaging device according to claim 7, wherein
the AD conversion unit includes multiple AD conversion units,
the multiple AD conversion units include a first AD conversion unit configured to AD-convert the first signal output from the only some of the pixels, and a second AD conversion unit configured to AD-convert the second signal output from some other pixels of the first pixel group,
the second AD conversion unit consumes current of a first current consumption amount upon AD conversion of the second signal, and
a current consumption amount of the second AD conversion unit is less than the first current consumption amount during a period for AD-converting the first signal by the first AD conversion unit.

11. The imaging device according to claim 5, further comprising:
a third signal line connected to the only some of the pixels;
a fourth signal line connected to some other pixels of the first pixel group;
a first current source connected to the third signal line; and
a second current source connected to the fourth signal line;
wherein the AD conversion unit includes multiple AD conversion units,
the multiple AD conversion units include a third AD conversion unit configured to AD-convert the first signal output from the only some of the pixels to the third signal line, and a fourth AD conversion unit configured to AD-convert the second signal output from the some other pixels to the fourth signal line,
a current consumption amount of the second current source during a period for outputting the second signal from the some other pixels to the fourth signal line is a second current consumption amount, and
during a period for AD-converting the first signal output to the third signal line by the third AD conversion unit, the current consumption amount of the second current source is less than the second current consumption amount.

12. The imaging device according to claim 2, further comprising:
a first chip having a first pixel with a color filter of a first color and a second pixel with a color filter of a second color as a color different from the first color; and
a second chip having the AD conversion unit and a second AD conversion unit,
wherein pixels of a first row include at least one first pixel and one second pixel,
pixels of a second row include at least one first pixel and one second pixel,
the first pixel of the first row is connected to the first signal line,
the first pixel of the second row is connected to the second signal line,
the second pixel of the first row is connected to a third signal line,
the second pixel of the second row is connected to a fourth signal line,
the first chip further includes
a first connection portion connected to the first signal line,
a second connection portion connected to the second signal line,
a third connection portion connected to the third signal line, and
a fourth connection portion connected to the fourth signal line, and
the second chip further includes
a fifth connection portion connecting the first connection portion and the AD conversion unit,
a sixth connection portion connecting the second connection portion and the AD conversion unit,
a seventh connection portion connecting the third connection portion and the second AD conversion unit, and
an eighth connection portion connecting the fourth connection portion and the second AD conversion unit.

13. The imaging device according to claim 11, further comprising:
a first chip having a first pixel with a color filter of a first color and a second pixel with a color filter of a second color as a color different from the first color; and
a second chip having the AD conversion unit and a second AD conversion unit,
wherein pixels of a first row include at least one first pixel and one second pixel,
pixels of a second row include at least one first pixel and one second pixel,
the first pixel of the first row is connected to the first signal line,
the first pixel of the second row is connected to the second signal line,
the second pixel of the first row is connected to a third signal line,
the second pixel of the second row is connected to a fourth signal line,
the first chip further includes
a first connection portion connected to the first signal line,
a second connection portion connected to the second signal line,
a third connection portion connected to the third signal line, and
a fourth connection portion connected to the fourth signal line, and
the second chip further includes
a fifth connection portion connecting the first connection portion and the AD conversion unit,
a sixth connection portion connecting the second connection portion and the AD conversion unit,
a seventh connection portion connecting the third connection portion and the second AD conversion unit, and
an eighth connection portion connecting the fourth connection portion and the second AD conversion unit.

14. The imaging device according to claim 12, wherein
as viewed in plane, the first connection portion and the second connection portion overlap with the AD conversion unit, and
as viewed in the plane, the third connection portion and the fourth connection portion overlap with the second AD conversion unit.

15. The imaging device according to claim 12, wherein
the first chip has
multiple first groups each including multiple first pixels, the first signal line, and the first connection portion, and
multiple second groups each including multiple second pixels, the second signal line, and the second connection portion, and
the second chip has multiple third connection portions, multiple fourth connection portions, a first selection unit having an input portion connected to the multiple third connection portions and an output portion connected to the AD conversion unit, and a second selection unit having an input portion connected to the multiple fourth connection portions and an output portion connected to the second AD conversion unit.

16. The imaging device according to claim 12, wherein
as viewed in plane, multiple first pixels and multiple second pixels overlap with the AD conversion unit.

17. The imaging device according to claim 1, wherein
the AD conversion unit generates a digital signal with a first bit number by AD conversion of the second signal, and generates a digital signal with a second bit number smaller than the first bit number by AD conversion of the first signal.

18. The imaging device according to claim 17, wherein the control unit causes the AD conversion unit to perform, with the first bit number, the AD conversion for converting the first signal output from the first pixel into the digital signal during the first period, and causes the AD conversion unit to perform, with the first bit number, the AD conversion for converting the first signal output from the second pixel into the digital signal during the second period, the control unit changes the bit number in the AD conversion of the AD conversion unit to the second bit number during a period between the second period and the third period, the control unit causes the AD conversion unit to perform, with the second bit number, the AD conversion for converting the second signal output from the first pixel into the digital signal during the third period, and the control unit causes the AD conversion unit to perform, with the second bit number, the AD conversion for converting the second signal output from the second pixel into the digital signal during the fourth period after the third period.

19. The imaging device according to claim 1, wherein the AD conversion unit performs AD conversion by comparison between the first signal and a ramp signal and AD conversion by comparison between the second signal and the ramp signal.

20. An imaging system comprising:

the imaging device according to claim 1; and a signal processing unit configured to process a signal output from the imaging device to generate an image.

21. A moving body comprising:

the imaging device according to claim 1; and a distance information obtaining unit configured to obtain information on a distance to a target object from a parallax image based on a signal from the imaging device, wherein a control unit configured to control the moving body based on the distance information is further provided.

* * * * *